United States Patent
Chunduri

(10) Patent No.: US 11,431,630 B2
(45) Date of Patent: Aug. 30, 2022

(54) METHOD AND APPARATUS FOR PREFERRED PATH ROUTE INFORMATION DISTRIBUTION AND MAINTENANCE

(71) Applicant: HUAWEI TECHNOLOGIES CO, LTD., Shenzhen (CN)

(72) Inventor: Uma S. Chunduri, Fremont, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/033,191

(22) Filed: Sep. 25, 2020

(65) Prior Publication Data

US 2021/0083975 A1   Mar. 18, 2021

Related U.S. Application Data

(63) Continuation of application No. PCT/US2019/020281, filed on Mar. 1, 2019.

(60) Provisional application No. 62/649,355, filed on Mar. 28, 2018.

(51) Int. Cl.
*H04L 45/741* (2022.01)
*H04L 45/02* (2022.01)
*H04L 45/121* (2022.01)

(52) U.S. Cl.
CPC ............ *H04L 45/741* (2013.01); *H04L 45/02* (2013.01); *H04L 45/121* (2013.01)

(58) Field of Classification Search
None
See application file for complete search history.

(56) References Cited

U.S. PATENT DOCUMENTS

| | | |
|---|---|---|
| 5,502,816 A | 3/1996 | Gawlick et al. |
| 7,751,405 B1 | 7/2010 | Kompella |
| 8,830,826 B2 | 9/2014 | Chen |
| 9,369,371 B2 | 6/2016 | Filsfils et al. |
| 9,450,817 B1 | 9/2016 | Bahadur et al. |
| 9,660,897 B1 | 5/2017 | Gredler |

(Continued)

FOREIGN PATENT DOCUMENTS

| | | |
|---|---|---|
| CN | 101036134 A | 9/2007 |
| CN | 101401083 A | 4/2009 |

(Continued)

OTHER PUBLICATIONS

Chunduri, "Usage of Non Shortest Path Forwarding (NSPF) IDs in OSPF," draft-ct-ospf-nspfid-for-sr-paths-00, Mar. 24, 2018, 14 pages.

(Continued)

*Primary Examiner* — Anh Ngoc M Nguyen
(74) *Attorney, Agent, or Firm* — Conley Rose, P.C.

(57) ABSTRACT

A method implemented in a domain in a multi-domain network, comprising maintaining a link state database (LSDB) comprising information describing a topology of the domain, receiving, from a network element (NE) in an area of the domain, preferred path route (PPR) information describing a PPR from a source to a destination in the area, the PPR information comprising a PPR identifier (PPR-ID) and a plurality of PPR description elements (PPR-PDEs) each representing an element on the PPR, and constructing an end-to-end path between the source and the destination based on the PPR information.

20 Claims, 18 Drawing Sheets

(56) References Cited

U.S. PATENT DOCUMENTS

| | | | |
|---|---|---|---|
| 9,838,246 | B1 | 12/2017 | Hegde et al. |
| 10,003,519 | B2 | 1/2018 | Lee |
| 10,122,614 | B2 | 11/2018 | Eckert et al. |
| 10,142,220 | B2 | 11/2018 | Santos et al. |
| 10,178,029 | B2 | 1/2019 | Levy et al. |
| 10,547,538 | B2 | 1/2020 | Chen et al. |
| 11,032,197 | B2 | 6/2021 | Nainar et al. |
| 2003/0005149 | A1 | 1/2003 | Haas et al. |
| 2003/0014540 | A1* | 1/2003 | Sultan .............. H04L 45/02 709/240 |
| 2004/0208119 | A1 | 10/2004 | Christodoulou et al. |
| 2006/0117110 | A1 | 6/2006 | Vasseur et al. |
| 2007/0214275 | A1 | 9/2007 | Mirtorabi et al. |
| 2008/0075016 | A1* | 3/2008 | Ashwood-Smith ..... H04L 45/02 370/252 |
| 2009/0185494 | A1 | 7/2009 | Li et al. |
| 2010/0220736 | A1 | 9/2010 | Mohapatra et al. |
| 2011/0032945 | A1* | 2/2011 | Mullooly .............. H04L 45/58 370/401 |
| 2011/0069713 | A1 | 3/2011 | Mariblanca Nieves |
| 2012/0224506 | A1* | 9/2012 | Gredler .............. H04L 45/121 370/254 |
| 2013/0103739 | A1 | 4/2013 | Salgueiro et al. |
| 2013/0286846 | A1 | 10/2013 | Atlas et al. |
| 2014/0379910 | A1 | 12/2014 | Saxena et al. |
| 2015/0055654 | A1 | 2/2015 | Song |
| 2015/0078205 | A1 | 3/2015 | Stoger |
| 2015/0229618 | A1 | 8/2015 | Wan et al. |
| 2015/0244607 | A1 | 8/2015 | Han |
| 2015/0244628 | A1 | 8/2015 | Gredler et al. |
| 2016/0192029 | A1 | 6/2016 | Bergstrom |
| 2016/0308758 | A1 | 10/2016 | Li et al. |
| 2017/0012895 | A1 | 1/2017 | Zhao et al. |
| 2017/0061138 | A1 | 3/2017 | Lambert |
| 2017/0104668 | A1 | 4/2017 | Zhang et al. |
| 2017/0187629 | A1* | 6/2017 | Shalev .............. H04L 61/2007 |
| 2017/0230276 | A1 | 8/2017 | Ceccarelli et al. |
| 2017/0289027 | A1 | 10/2017 | Ratnasingham |
| 2017/0346718 | A1 | 11/2017 | Psenak et al. |
| 2018/0351864 | A1 | 12/2018 | Jeganathan et al. |
| 2019/0058657 | A1 | 2/2019 | Chunduri et al. |
| 2019/0278284 | A1 | 9/2019 | Zhang et al. |
| 2020/0021515 | A1 | 1/2020 | Michael et al. |
| 2021/0176168 | A1 | 6/2021 | Eckert et al. |

FOREIGN PATENT DOCUMENTS

| | | |
|---|---|---|
| CN | 106063203 A | 10/2016 |
| CN | 106301952 A | 1/2017 |
| CN | 107637031 A | 1/2018 |
| WO | 2015167479 A1 | 11/2015 |
| WO | 2017141078 A1 | 8/2017 |

OTHER PUBLICATIONS

Bates, et al., "Multiprotocol Extensions for BGP-4," RFC 4760, Jan. 2007, 12 pages.

Psenak, et al., "Multi-Topology (MT) Routing in OSPF," RFC 4915, Jun. 2007, 20 pages.

Przygiena, et al., "M-ISIS: Multi Topology (MT) Routing in Intermediate System to Intermediate Systems (IS-ISs)," RFC 5120 Feb. 2008, 14 pages.

Gredler, Ed., et al., "North-Bound Distribution of Link-State and Traffic Engineering (TE) Information Using BGP," RFC 7752, Mar. 2016, 48 pages.

Filsfils, Ed., et al., "Segment Routing Architecture," RFC 8402, Jul. 2018, 32 pages.

Previdi, S., Ed., et al., "IS-IS Extensions for Segment Routing," draft-ietf-isis-segment-routing-extensions-15, Dec. 19, 2017, 34 pages.

Dhody, D., Ed., et al., "A YANG Data Model for Path Computation Element Communications Protocol (PCEP)," draft-ietf-pce-pcep-yang-06, Jan. 5, 2018, 108 pages.

Tantsura, J., et al., "Signaling MSD (Maximum SID Depth) Using IS-IS," draft-ietf-isis-segment-routing-msd-09, Jan. 10, 2018, 9 pages.

Xu, X., et al., "Signaling Entropy Label Capability and Readable Label-stack Depth Using IS-IS," draft-ietf-isis-mpls-elc-03, Jan. 3, 2018, 6 pages.

Filsfils, C., Ed., et al., "Segment Routing Architecture," draft-ietf-spring-segment-routing-14, Dec. 20, 2017, 31 pages.

Litkowski, S., et al., "YANG Data Model for Segment Routing," draft-ietf-spring-sr-yang-08, Dec. 28, 2017, 29 pages.

Hegde, S., "Traffic Accounting for MPLS Segment Routing Paths," draft-hegde-spring-traffic-accounting-for-sr-paths-01, Oct. 30, 2017, 14 pages.

Chunduri, U., et al., "Preferred Path Routing (PPR) in IS-IS," draft-chunduri-lsr-isis-preferred-path-routing-01, Jul. 2, 2018, 51 pages.

Qu, Y., et al., "YANG Data Model for Preferred Path Routing," draft-qct-lsr-ppr-yang-00, Jun. 27, 2018, 56 pages.

Previdi, S., Ed., et al., "IPv6 Segment Routing Header (SRH)," draft-ietf-6man-segment-routing-header-08, Jan. 20, 2018, 35 pages.

Awduche, D., et al., "RSVP-TE: Extensions to RSVP for LSP Tunnels," RFC 3209, Dec. 2001, 57 pages.

Kompella, K., et al., "The Use of Entropy Labels in MPLS Forwarding," RFC 6790, Nov. 2012, 25 pages.

Psenak, P., et al., "OSPFv2 Prefix/Link Attribute Advertisement," RFC 7684, Nov. 2015, 15 pages.

Crabbe, E., et al., "Path Computation Element Communication Protocol (PCEP) Extensions for PCE-Initiated LSP Setup in a Stateful PCE Model," RFC 8281, Dec. 2017, 20 pages.

Quinn, P., Ed., et al., "Network Service Header (NSH)," RFC 8300, Jan. 2018, 40 pages.

Chunduri, U., "BGP Link-State extensions for NSPF ID," draft-chunduri-idr-bgp-ls-nspfid-00, Apr. 2, 2018, 7 pages.

Chunduri, U., Ed., et al., "Usage of Non Shortest Path Forwarding (NSPF) IDs in IS-IS," draft-ct-isis-nspfid-for-sr-paths-01, Mar. 23, 2018, 16 pages.

Han, L., et al., "Ipv6 in-band signaling for the support of transport with QoS," draft-han-6man-in-band-signaling-for-transport-qos-00, Oct. 11, 2017, 40 pages.

Previdi, S., et al., "Ipv6 Segment Routing Header (SRH)," draft-ietf-6man-segment-routing-header-11, Mar. 28, 2018, 34 pages.

Filsfils, C., Ed., et al., "Segment Routing Architecture," draft-ietf-spring-segment-routing-15, Jan. 25, 2018, 31 pages.

Chunduri, Uma S.; U.S. Appl. No. 62/634,425; Title: "Advertising and Programming a Non-Shortest Path Forwarding Identifier in Interior Gateway Protocols"; filed Feb. 23, 2018.

Adams, C., et al., "The Simple Public-Key GSS-API Mechanism (SPKM)," RFC 2025, 45 pages.

Braden, R., Ed., et al., "Resource Reservation Protocol (RSVP)," RFC 2205, Sep. 1997, 112 pages.

Li, T., et al., "IS-IS Extensions for Traffic Engineering," RFC 5305, Oct. 2008, 17 pages.

Previdi, S., Ed., et al., "IS-IS Traffic Engineering (TE) Metric Extensions," RFC 7810, May 2016, 18 pages.

Atlas, A., Ed., et al., "Basic Specification for IP Fast Reroute: Loop-Free Alternates," RFC 5286, Sep. 2008, 31 pages.

Bryant, S., et al., "Remote Loop-Free Alternate (LFA) Fast Reroute (FRR)," RFC 7490, Apr. 2015, 29 pages.

Bashandy, A., et al., "Loop avoidance using Segment Routing, draft-bashandy-rtgwg-segment-routing-uloop-03," Apr. 2, 2018, 7 pages.

Bashandy, A., et al., "Topology Independent Fast Reroute using Segment Routing, draft-bashandy-rtgwg-segment-routing-ti-lfa-05," Oct. 4, 2018, 19 pages.

Sivabalan, S., et al., "PCEP Extensions for Segment Routing," draft-ietf-pce-segment-routing-11, Nov. 20, 2017, 22 pages.

Bashandy, A., et al., "Topology Independent Fast Reroute using Segment Routing," draft-bashandy-rtgwg-segment-routing-ti-lfa-04, Mar. 30, 2018, 18 pages.

Mirsky, G., et al., "Bidirectional Forwarding Detection (BFD) in Segment Routing Networks Using MPLS Dataplane," draft-mirsky-spring-bfd-05, Mar. 1, 2018, 11 pages.

(56) References Cited

OTHER PUBLICATIONS

Atlas, A., et al., "An Architecture for IP/LDP Fast Reroute," RFC 7812, Jun. 2016, 44 pages.
Jumar, N., Ed., et al., "Label Switched Path (LSP) Ping/Traceroute for Segment Routing (SR) IGP-Prefix and IGP-Adjacency Segment Identifiers (SIDs) with MPLS Data Planes," RFC 8287, Dec. 2017, 25 pages.
Alimi, Ed., et al., "Application-Layer Traffic Optimization (ALTO) Protocol," RFC 7285, Sep. 2014, 91 pages.
U.S. Appl. No. 62/663,115; Title: "Resource Reservations and Maintenance for Preferred Paths in the Network Through Routing Protocols," filed Apr. 26, 2019.

* cited by examiner

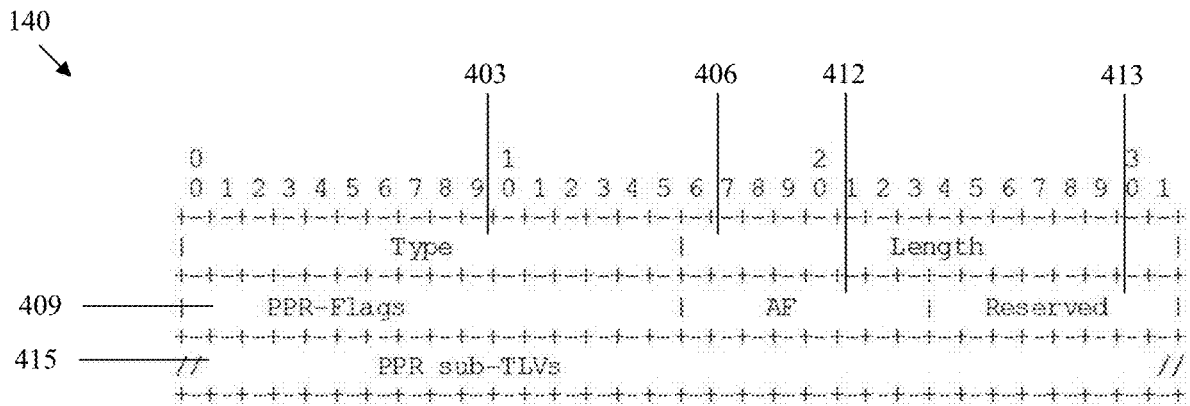
FIG. 4A
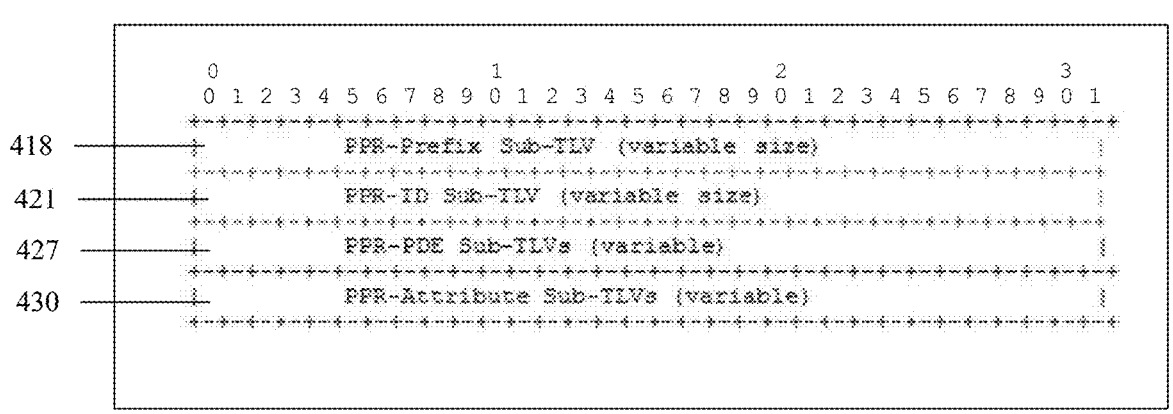
FIG. 4B
| PPR-ID 333 | PPR-Type 443 | PPR-PDE 366A | ... | PPR-PDE 366N |
FIG. 4C IS-IS PPR-ID Sub-TLV Format IS-IS PPR-ID Flags Format IS-IS PPR-PDE Sub-TLV
Format IS-IS PPR-PDE Flags Format OSPFv2 PPR-ID Sub-TLV Format OSPFv2 PPR-ID Flags Format OSPFv2 PPR-PDE Sub-TLV
Format OSPFv2 PPR-PDE Flags
Format OSPFv3 PPR-ID Sub-TLV Format

1000

```
     ┌─────────┐
     │  START  │
     └────┬────┘
          ▼
┌───────────────────────────────────────────────────────────────┐
│ Maintain a link state database (LSDB) comprising information  │
│ describing a topology of a domain                             │
└───────────────────────────────────────────────────────────────┘
```
1003

```
┌───────────────────────────────────────────────────────────────┐
│ Transmit, to a network element of the domain, preferred path  │
│ route (PPR) information describing a PPR path between two NEs │
│ in the area, the PPR information comprising a PPR identifier  │
│ (PPR-ID) and a plurality of PPR path description elements     │
│ (PPR-PDEs) each representing an element on the PPR            │
└───────────────────────────────────────────────────────────────┘
          ▼
     ┌─────────┐
     │   END   │
     └─────────┘
```
1006

FIG. 10

METHOD AND APPARATUS FOR PREFERRED PATH ROUTE INFORMATION DISTRIBUTION AND MAINTENANCE

CROSS-REFERENCE TO RELATED APPLICATIONS

The present application is a continuation of International Application No. PCT/US2019/020281 filed on Mar. 1, 2019, by Futurewei Technologies, Inc., and titled "Method and Apparatus for Preferred Path Route Information Distribution and Maintenance," which claims the benefit of U.S. Provisional Patent Application No. 62/649,355 filed Mar. 28, 2018 by Uma S. Chunduri, and entitled "Method And Apparatus For Non Shortest Path Forwarding Identifiers (NSPF ID) Distribution And Maintenance," all of which are incorporated herein by reference as if reproduced in their entireties.

FIELD OF INVENTION

The present disclosure pertains to the field of source routing and networking in a multi-domain network. In particular, the present disclosure relates to the construction of an end-to-end path between a source and a destination through multiple domains based on preferred path routing (PPR) information for each domain in the multi-domain network.

BACKGROUND

In a network implementing source routing, a controller that has knowledge of a complete topology of the underlying network can program an ingress node of the network with a custom path that certain traffic has to travel to reach a destination. This custom path may not necessarily be the shortest path between the ingress node and the destination and may be programmed based on traffic engineering or business requirements. An ingress node in the network may use a separate flow classification technique to associate certain traffic flow with a custom path (e.g., a source and/or destination addresses).

In a network implementing segment routing (SR), packets are steered through the network using segment identifiers (SIDs) that uniquely identify segments in the network. A segment may include one or more nodes, interfaces, and links between two nodes in the network. The SIDs are typically carried in the header of the packet.

Currently there are two data planes that use segment routing to provision custom paths in a network-Segment Routing (SR) Multi-Protocol Label Switching (MPLS) (SR-MPLS) and SR-Internet Protocol (IP) Version 6 (IPv6) (SR-IPv6). In SR-MPLS, each segment is encoded as a label, and an ordered list of segments are encoded as a stack of labels in the header of the packet. Similarly, in SR-IPv6, each segment is encoded as an IPv6 address within a segment routing header (SRH).

SUMMARY

According to a first aspect of the present disclosure, there is provided a method implemented in a domain in a multi-domain network. The method comprises maintaining a link state database (LSDB) comprising information describing a topology of the domain, receiving, from a network element (NE) in an area of the domain, preferred path route (PPR) information describing a PPR from a source to a destination in the area, the PPR information comprising a PPR identifier (PPR-ID) and a plurality of PPR description elements (PPR-PDEs) each representing an element on the PPR, and constructing an end-to-end path between the source and the destination based on the PPR information.

In a first implementation of the method according to the first aspect, second PPR information is received from a second NE in a second area of the multi-domain network, wherein the LSDB is updated based on the PPR information received from the NE and the second PPR received from the second NE, and wherein the end-to-end path is constructed based on the PPR information and the second PPR information.

In a second implementation of the method according to the first aspect or any preceding implementation of the first aspect, the PPR information is received from the NE in an update encoded as a Border Gateway Protocol (BGP) Link State (BGP-LS) Prefix Network Layer Reachability Information (NLRI).

In a third implementation of the method according to the first aspect or any preceding implementation of the first aspect, the domain comprises a plurality of areas including the area and a second area, and wherein the information in the LSDB describes a topology of the area and the second area of the domain.

In a fourth implementation of the method according to the first aspect or any preceding implementation of the first aspect, the LSDB stores information associated with the PPR and a predetermined shortest path between the source and the destination, wherein the PPR deviates from the predetermined shortest path between the source and the destination based on a network characteristic requested by a source, and wherein the network characteristic comprises at least one of bandwidth, jitter, latency, throughput, or error.

In a fifth implementation of the method according to the first aspect or any preceding implementation of the first aspect, the PPR-ID is at least one of a Multi-Protocol Label Switching (MPLS) label, a segment identifier (SID), an Internet Protocol (IP) version 4 (IPv4) address, or an IP version 6 (IPv6) address.

In a sixth implementation of the method according to the first aspect or any preceding implementation of the first aspect, each of the plurality of PPR-PDEs represents a topological element or a non-topological NE on the PPR, wherein the topological element comprises at least one of a network element or a link, and wherein the non-topological element comprises at least one of a service, function, or context.

In a seventh implementation of the method according to the first aspect or any preceding implementation of the first aspect, the method further comprises forwarding the PPR information to a central entity in the multi-domain network in response to filtering the PPR information based on a policy.

According to a second aspect of the present disclosure, there is provided a NE in an area of a domain within a multi-domain network. The NE comprises a memory configured to store a link state database (LSDB) describing a topology of the domain. The NE further comprises a transmitter coupled to the memory and configured to transmit preferred path route (PPR) information describing a PPR between two NEs in the area to a central entity of the domain, the PPR information comprising a PPR identifier (PPR-ID) and a plurality of PPR description elements (PPR-PDEs) each representing an element on the PPR, and transmit the PPR information to a plurality of remaining NEs in the area.

In a first implementation of the NE according to the second aspect, the PPR information is transmitted to the central entity in an update encoded as a Border Gateway Protocol (BGP) Network Layer Reachability Information (NLRI) Prefix.

In a second implementation of the NE according to the second aspect or any preceding implementation of the second aspect, end-to-end path information describing an end-to-end path between a source and a destination is received from a central entity and forwarded to the plurality of NEs in the area in an advertisement encoded based on an underlying Interior Gateway Protocol (IGP) implemented by the domain.

In a third implementation of the NE according to the second aspect or any preceding implementation of the second aspect, each of the plurality of PPR-PDEs comprises an address of a respective element on the PPR and a path description element (PDE) identifier (PDE-ID) that defines a type of the address.

In a fourth implementation of the NE according to the second aspect or any preceding implementation of the second aspect, the NE is configured as at least one of a Border Gateway Protocol (BGP) Route Reflector (RR), a BGP-Link State (LS) speaker, or an Automated System Border Router (ASBR).

According to a third aspect of the present disclosure, there is provided a non-transitory medium configured to store a computer program product comprising computer executable instructions that, when executed by a processor of a central entity implemented in a domain of a multi-domain network, cause the processor to maintain a link state database (LSDB) comprising information describing a topology of the domain, and transmit, to a network element (NE) in an area of the domain, preferred path route (PPR) information describing a PPR from a source to a destination in the area, the PPR information comprising a PPR identifier (PPR-ID) and a plurality of PPR description elements (PPR-PDEs) each representing an element on the PPR.

In a first implementation of the non-transitory medium according to the third aspect, the PPR information is transmitted to NE in a message encoded as a Border Gateway Protocol (BGP)-Link State (LS).

In a second implementation of the non-transitory medium according to the third aspect or any preceding implementation of the third aspect, second PPR information is received from a second central entity of a second domain of the multi-domain network, wherein the LSDB is updated based on the PPR information received from the NE and the second PPR received from the second central entity.

In a third implementation of the non-transitory medium according to the third aspect or any preceding implementation of the third aspect, the computer executable instructions, when executed by the processor, further cause the processor to construct an end-to-end path between the source and the destination based on the PPR information.

In a fourth implementation of the non-transitory medium according to the third aspect or any preceding implementation of the third aspect, the PPR-ID is at least one of a Multi-Protocol Label Switching (MPLS) label, a segment identifier (SID), an Internet Protocol (IP) version 4 (IPv4) address, or an IP version 6 (IPv6) address.

In a fifth implementation of the non-transitory medium according to the third aspect or any preceding implementation of the third aspect, each of the PPR-PDEs comprises an address of a respective element on the PPR.

In a sixth implementation of the non-transitory medium according to the third aspect or any preceding implementation of the third aspect, the LSDB stores information associated with the PPR and a predetermined shortest path between the source and the destination, wherein the PPR deviates from the predetermined shortest path between the source and the destination based on a network characteristic requested by a client, and wherein the network characteristic comprises at least one of bandwidth, jitter, latency, throughput, or error rate.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4A is a diagram illustrating an update including PPR information that is transmitted from an NE in a domain to a controller of the domain according to various embodiments of the disclosure.

FIG. 4B is a diagram illustrating the PPR information included in the update shown in FIG. 4A according to various embodiments of the disclosure.

FIG. 4C is a diagram illustrating an example of the PPR information of FIGS. 4A-B according to various embodiments of the disclosure.

FIG. 10 shows an apparatus for implementing PPR information distribution and maintenance in a multi-domain network according to various embodiments of the disclosure.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In a controller based multi-domain network, each domain within the multi-domain network is controlled by a central entity. An end-to-end path between a source and destination often passes through more than one domain within the multi-domain network. Within each domain, a path between ingress and egress network elements (NEs) may be provisioned as a shortest path or a Preferred Path Route (PPR). A shortest path may be provisioned based on Link State Databases (LSDBs) stored locally at each of the NEs in the domain. A PPR may be provisioned based on network, application, or service requirements requested by the source or application hosted by the source. While the central entity at each domain may store the topological information and the LSDBs that are associated with a respective domain, the central entity often does not the store PPR information that is used to provision the PPRs across the domain.

Disclosed herein are embodiments directed to the distribution and maintenance of PPR information within a domain and across domains in a multi-domain network. In an embodiment, an NE within an area of a domain may receive PPR information describing one or more PPRs in the area of the domain. The PPR information may be received in an advertisement encoded according to an Interior Gateway Protocol (IGP) implemented by the domain, or an area within the domain. The NE may be configured to encode the PPR information into a protocol enabling northbound communication with the central entity, such as Border Gateway Protocol (BGP)-Link State (LS) (BGP-LS). In an embodiment, the PPR information is then transmitted to the central entity using the protocol enabling northbound communication. Upon receiving the PPR information, the central entity may share the PPR information with other central entities in the multi-domain network. In this way, central entities in the multi-domain network may provision end-to-end paths across multiple domains using both shortest paths and PPRs.

Figure 1:
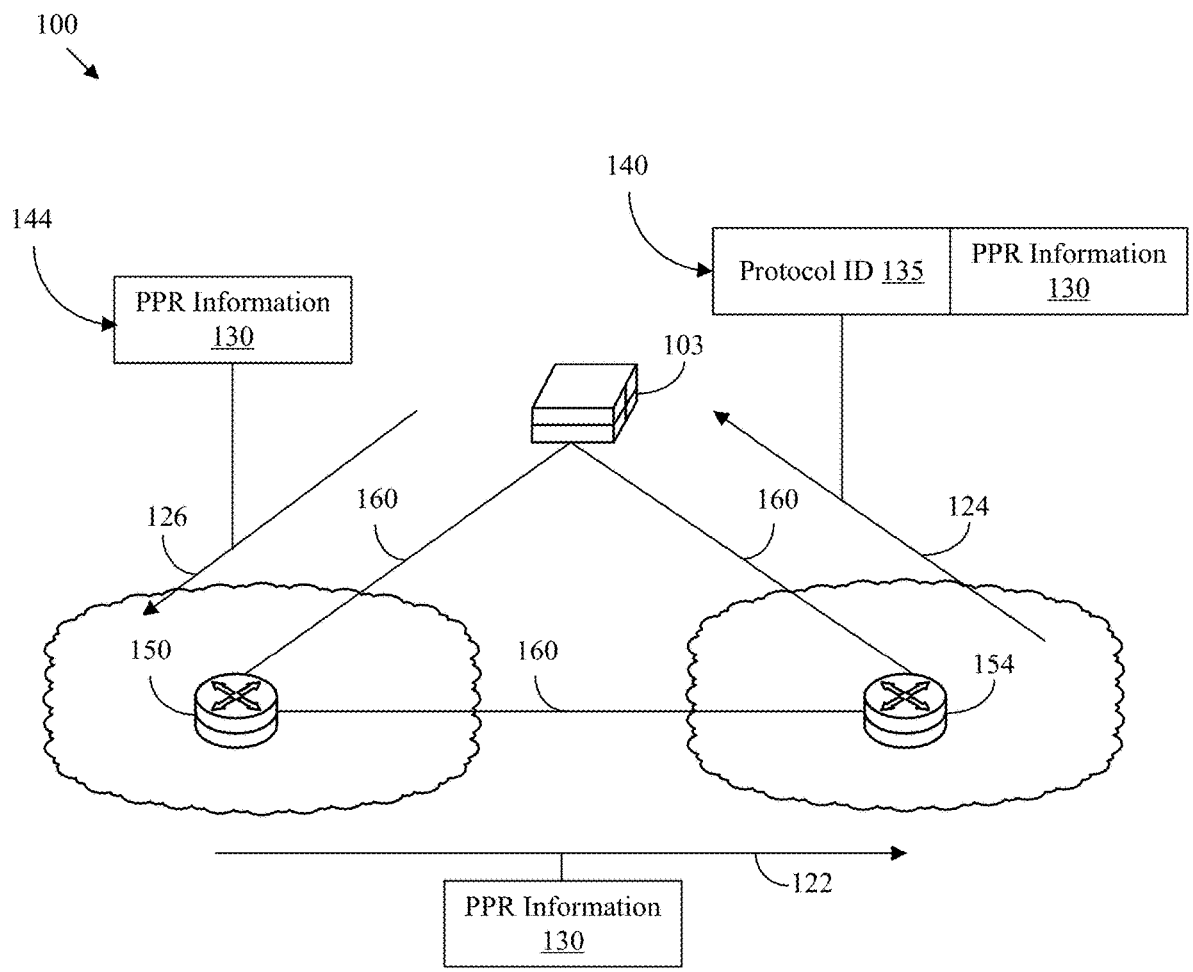
FIG. 1 is a diagram illustrating a network configured to implement preferred path routing according to various embodiments of the disclosure.

FIG. 1 is a diagram illustrating a domain 100 (also referred to herein as an "administrative domain" or "automated system"), which is a network or subnetwork configured to implement preferred path routing according to various embodiments of the disclosure. The domain 100 comprises a central entity 103 (also referred to herein as a "controller") and two NEs 150 and 154, which are interconnected by links 160.

In an embodiment, the central entity 103 may be substantially similar to a Path Computation Element (PCE), which is further described in Internet Engineering Task Force (IETF) Request for Comments (RFC) 8281, entitled "Path Computation Element Communication Protocol (PCEP) Extensions for PCE-Initiated LSP Setup in a Stateful PCE Model," by E. Crabbe, dated December 2017. In an embodiment, the central entity 103 may be substantially similar to a Software Defined Network Controller (SDNC), which is further described in the IETF RFC 8402 entitled "Segment Routing Architecture," by C. Filsfils, dated July 2018. In an embodiment, the central entity 103 may be substantially similar to an Application Layer Traffic Optimization (ALTO) server, which is further described in the IETF RFC 7285, entitled "Application Layer Traffic Optimization (ALTO) Protocol," by R. Alimi, dated September 2014.

NEs 150 and 154 (also referred to herein as "nodes") may be a physical device, such as a router, a bridge, a network switch, or a logical device configured to perform switching and routing using the preferred path routing mechanisms disclosed herein. In an embodiment, NEs 150 and 154 may be headend nodes or edge nodes positioned at an edge of the domain 100. For example, NE 150 may be an ingress node at which traffic (e.g., control packets and data packets) is received, and NE 154 may an egress node from which traffic is transmitted.

The links 160 may be wired or wireless links or interfaces interconnecting each of the NEs 150 and 154 together and interconnecting each of the NEs 150 and 154 to the central entity 103. While NEs 150 and 154 are shown in FIG. 1 as headend nodes, it should be appreciated that NEs 150 and 154 may otherwise be an intermediate node or any other type of NE. Although only two NEs 150 and 154 are shown in FIG. 1, it should be appreciated that the domain 100 shown in FIG. 1 may include any number of NEs. In an embodiment, the central entity 103 and NEs 150 and 154 are configured to implement various packet forwarding protocols, such as, but not limited to, MPLS, IPv4, IPv6, and Big Packet Protocol.

In the domain 100, the NEs 150 and/or 154 may communicate with the central entity 103 in both directions. In an embodiment, the NEs 150 and/or 154 may send north bound communications from the NEs 150 and/or 154 to the central entity 103 using various protocols, such as BGP-LS or PCEP. BPG-LS is further described in the IETF RFC 7752, entitled "North-Bound Distribution of Link-State and Traffic Engineering (TE) Information using BGP," by H. Gredler, dated March 2016. In an embodiment, the central entity 103 sends south bound communications from the central entity 103 to the NEs 150 and/or 154 using various protocols, such as OPENFLOW, BGP-LS, PCEP, or with NetConf/Restconf in conjunction with a YANG data model. The YANG data model is described by link state routing (LSR) Working Group draft document, entitled "YANG data model for Preferred Path Routing," by Y. Qu, dated Jun. 27, 2018.

Each of the NEs 150 and 154 in the domain 100 maintains one or more LSDBs storing link-state information about nodes and links in any given area. Link attributes stored in these LSDBs include local/remote IP address, local/remote interface identifiers, link metrics and TE metrics, link bandwidth, reserveable bandwidth, per Class-of-Service (CoS) class reservation state, preemption, and Shared Risk Link Groups (SLRGs). Each of the NEs 150 and 154 may retrieve topology information from the locally stored LSDBs and distribute the topology information to a consumer or central entity 103, either directly or via a peer BGP speaker (or Route Reflector), using an advertisement, such as a BGP link state Network Layer Reachability Information (NLRI) (also referred to herein as a "BGP NLRI") or BGP-LS attribute, both of which are further described in IETF RFC 7752.

A BGP NLRI is a BGP container for carrying opaque information that describes either a node, link, or prefix. As described by IETF RFC 7752, there are three types of BGP link-state NLRIs: a node NLRI, a link NLRI, and a prefix NLRI, each of which may carry information describing a node, a link, and a prefix, respectively. In an embodiment, for two NEs 150 or 154 or the central entity 103 to send BGP NLRIs, both the NEs 150 or 154 and the central entity 103 may use a BGP capabilities advertisement to ensure that the respective NE 150 or 154 is capable of properly processing the BGP NLRI, as specified by IETF RFC 4760, entitled "Multiprotocol Extensions for BGP-4," by T. Bates, et al. dated January 2007. In an embodiment, each BGP NLRI includes a protocol identifier (ID) field, which may include an identifier of the IGP used to encode the PPR information, as will be further described below. A BGP-LS attribute is an optional, non-transitive BGP attribute that is used to carry link, node, and prefix parameters and attributes. The BGP-LS attribute is defined as a set of Type/Length/Value triplets, that may be included in a BGP NLRI.

The central entity 103 may determine the network topology using the advertisements sent by each of the NEs 150 and/or 154 in the domain 100, where the advertisements may include prefixes, SIDs, TE information, IDs of adjacent NEs, links, interfaces, ports, and routes. In an embodiment in which the domain 100 implements BGP-LS, the NEs 150 and/or 154 transmit such advertisements encoded as an update, which refers to a message or control packet that carries link state information, such as a BGP NLRI. The central entity 103 is configured to collect TE information and link-state information from NEs 150 and/or 154 within the domain 100. In some cases, the central entity 103 may share at least a portion of the collected TE information and link-state information with other domains in a multi-domain network (as will be further described below with reference to FIGS. 2A-B).

In some embodiments, the central entity 103 is configured to determine or construct paths between two NEs 150 and 154 positioned at edges of the domain 100 (or area, as will be further described below with reference to FIG. 2A) using a network topology of the domain 100 and capabilities of NEs 150 and 154 within domain 100. In an embodiment in which the domain 100 implements preferred path routing, the central entity 103 is configured to determine a shortest path between the two NEs 150 and 154 and one or more PPRs between the two NEs 150 and 154.

A shortest path refers to a path between two NEs or between a source and destination that is determined based on a metric, such as, for example, a cost or weight associated with each link on the path, a number of NEs on the path, a number of links on the path, etc. In an embodiment, a shortest path may be computed for a destination using a Dijkstra's Shortest Path First (SPF) algorithm. A PPR (also referred to herein as a Non-Shortest Path (NSP)) refers to a custom path or any other path that may deviate from the shortest path computed between two NEs or between a source and destination. The PPRs may be determined based on an application or server request for a path between two NEs 150 and 154 or between a source and destination that satisfies one or more network characteristics (such as TE characteristics obtained by the central entity 103 dynamically through BGP-LS or PCEP) or service requirements. The network characteristic may be at least one of bandwidth, jitter, latency, throughput, or error rate. The PPRs and the shortest paths may each comprise a sequential ordering of one or more NEs 150 and/or 154 on the PPR and/or one or more links 160 on the PPR, which may be identified by labels, addresses, or IDs. Examples of the shortest path and the PPR will be further described below with reference to FIGS. 2A-B.

In an embodiment in which the domain 100 implements PPR, one of the headend NEs 150 and/or 154 is configured with PPR information for one or more PPRs. The PPR information may be configured at the headend NE 150 or 154 in various ways. In one embodiment, an operator may manually configure PPR information for one more PPRs into the headend NE 150 or 154. In one embodiment, the headend NE 150 or 154 may receive the PPR information from an external entity or the central entity 103. In an embodiment in which the domain 100 does not implement an IGP flooding mechanism, the central entity 103 may be a controller that is connected to every NE 150 and 154 in the domain 100. In this embodiment, the central entity 103 is manually configured to send advertisements including the PPR information to all the other NEs 150 and 154 in the domain 100 instead of just sending the advertisement to the single ingress NE 150 or 154.

In an embodiment, the PPR information may include a PPR-ID and one or more PPR-PDEs that each describes an element on a respective PPR. When the domain 100 implements an IGP flooding mechanism, the headend NE 150 or 154 floods the PPR information throughout domain 100 (or area within the domain 100, as will be further described below with reference to FIG. 2A) after the headend NE 150 or 154 receives the PPR information. For example, the headend NE 150 and/or 154 transmits the PPR information in an advertisement to all the other NEs within the domain 100. Each of the NEs 150 and/or 154 in the domain 100 that receives the advertisement first determines whether the respective NE 150 or 154 is identified in the PPR-PDEs for one or more of the advertised PPRs. If so, then the NE 150 or 154 updates a locally stored forwarding database to indicate that data packets including this particular PPR-ID should be routed along the PPR identified by the PPR-ID in the forwarding database instead of the predetermined shortest path.

In some cases, the PPR information received at a headend NE 150 or 154 and flooded through the domain 100 may not be stored or available at the central entity 103 associated with that domain 100. The PPR information may also not be available at the central entities 103 of other domains 100 in a multi-domain network. However, the central entity 103 may need the PPR information regarding the available PPRs in the domain 100 and other domains 100 in a multi-domain network to provision an end-to-end path, which may be across multiple different domains 100.

Embodiments of the present disclose are directed to methods, systems, and apparatuses configured to communicate the PPR information to the central entity 103. In an embodiment, the central entity 103 may filter and share the PPR information across other domains 100 such that central entities 103 across different domains 100 are capable of provisioning end-to-end paths across multiple domains 100.

In an embodiment, as shown by arrow 122, a headend NE 154 is configured to receive the PPR information 130 from another NE 150 via an IGP flooding mechanism, in which control packets are transmitted (or flooded) to every NE 154 within an area of a domain 100. The PPR information may be encoded using an IGP, such as, for example, Open Shortest Path First (OSPF) Version 2 (OSPFv2), OSPF Version 3 (OSPFv3), Intermediate System-Intermediate System (IS-IS), or direct SDN. Examples of the PPR information encoded as the first IGP are shown by FIGS. 5-7.

In an embodiment, once the headend NE 154 obtains the PPR information 130, the headend NE 154 encodes the PPR information 130 into another protocol that is used for northbound communications with the central entity 103. The headend NE 154 then transmits the PPR information 130 to the central entity 103.

In an embodiment, the headend NE 154 encodes the PPR information 130 into an update 140, such as the update that will be further described below with reference to FIGS. 4A-B. In an embodiment, the update 140 may be encoded as a BGP NLRI. The update 140 may include various sub-type-length-values (TLVs), as will be further described below with reference to FIGS. 5-7.

In an embodiment, the headend NE 154 determines a protocol ID 135 identifying the IGP encoding of the PPR information 130 that is included in the update 140 and adds the protocol ID 135 to the update 140. In an embodiment, as shown by arrow 124, the headend NE 154 transmits the update 140 including the protocol ID 135 and the PPR information 130 to the central entity 103. In an embodiment, the update 140 may be encoded as a BGP NLRI. In an embodiment, the BGP NLRI may be a BGP-LS Prefix NLRI. For a BGP-NLRI, RFCE 7752 defines several BGP-LS attributes. Additional BGP-LS attributes are defined herein to convey PPR information, as will be further described below.

While the example in FIG. 1 describes a headend NE 154 as the NE in the domain 100 responsible for transmitting the PPR information 130 to the central entity 103, any NE 150 or 154 in the domain 100 that is configured with BGP-LS may be configured to transmit the PPR information 130 to the central entity 103. As described above, after the domain 100 is flooded with the advertisement including the PPR information 130, all of the NEs 150 and 154 in the domain 100 maintain and store the PPR information 130. Therefore, any of the NEs 150 and/or 154 in the domain 100 that maintain and store the PPR information 130 and are also configured to perform northbound communication with the central entity 103 and may be the NE 150 and/or 154 responsible for communicating the PPR information to the central entity 103. In an embodiment, the NE 150 and/or 154 in the domain 100 that communicates the PPR information 130 to the central entity 103 may be a BGP speaker, which refers to a device that implements BGP. The NE 150 and/or 154 in the domain 100 that communicates the PPR information 130 to the central entity 103 may otherwise be a BGP route reflector, an edge node, an Automated System Border Router (ASBR), and/or any other NE in the domain 100 (or area).

In an embodiment, after the central entity 103 receives the update 140 including PPR information 130 and the protocol ID 135 from the headend NE 154, the central entity 103 extracts the PPR information 130 from the update 140 and decodes the PPR information 130 using the IGP identified by the protocol ID 135. The central entity 103 stores the PPR information 130 in a local database that may later be used to determine end-to-end paths across domain 100 or across multiple domains 100.

Upon determining end-to-end paths across on or more domains 100, the central entity 103 generates end-to-end path information describing and identifying an end-to-end path between a source and destination of a network including one or more domains 100. In an embodiment, the central entity 103 sends the end-to-end path information to one or more headend NEs 150 and/or 154 in a domain 100.

In an embodiment, the central entity 103 may further process the PPR information 130 and send the processed PPR information 130 down to a headend NE 150, as shown by arrow 126. For example, an operator of the domain 100 may input additional information, such as application or service requirements, to the central entity 103. The central entity 103 may use the operator provided information to determine new PPR information 130 describing new PPRs that should be provisioned in the domain 100. The central entity 103 may transmit this new PPR information 130 down to the headend NE 150. The PPR information 130 may be transmitted southbound from the central entity 103 to the headend NE 150 in a message 144 encoded using BGP-LS. In an embodiment, after the headend NE 150 receives the new PPR information 130 encoded as BGP-LS, the headend NE 150 may extract the PPR information 130 from the message 144, and encode the PPR information 130 into the IGP implemented by the domain 100. After which the headend NE 150 floods (or transmits) this new PPR information 130 to all the other NEs 154 in the domain 100.

Figure 2A:
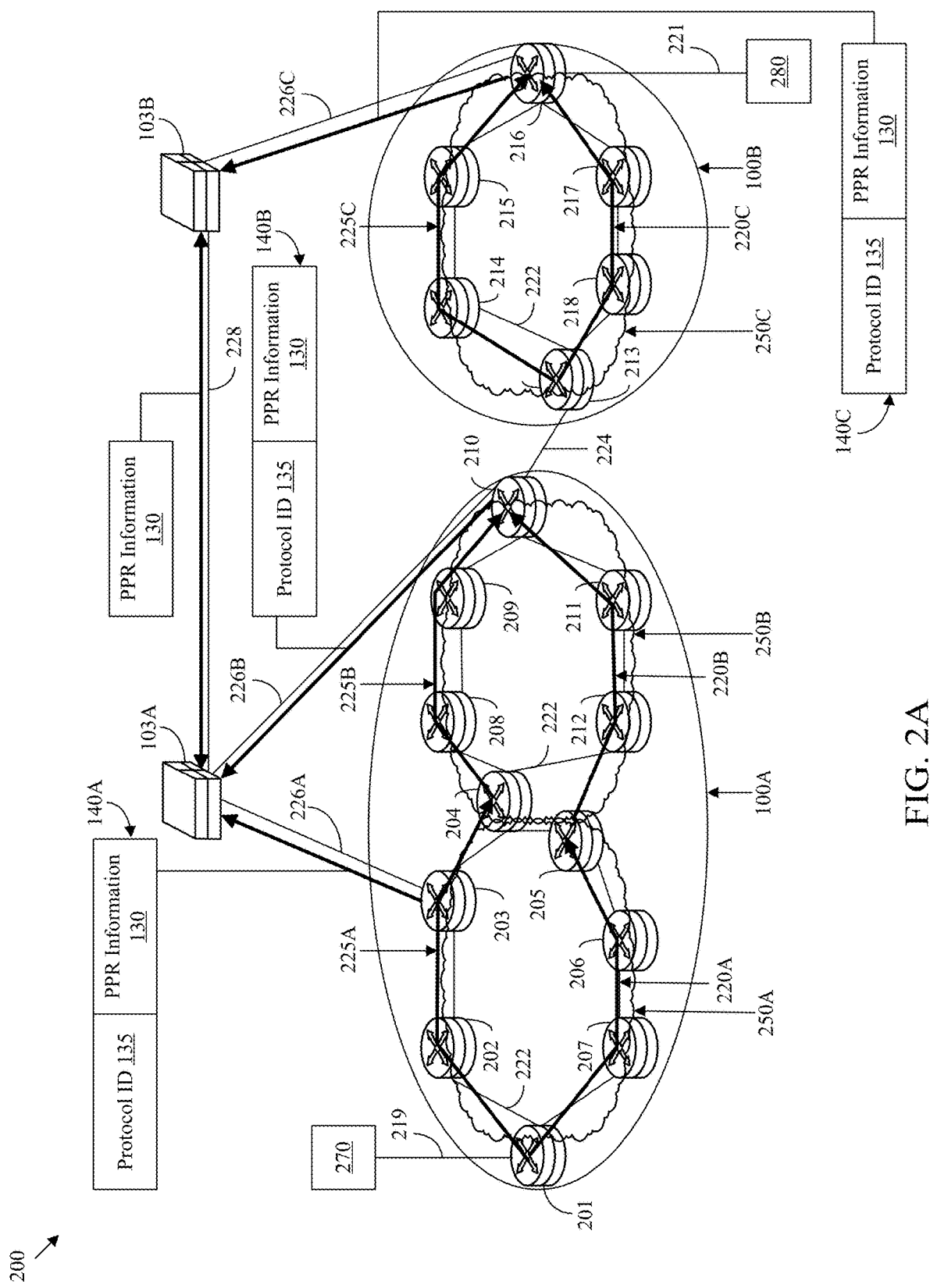
FIGS. 2A-B are diagrams illustrating a multi-domain network configured to implement preferred path routing to construct an end-to-end path according to various embodiments of the disclosure.
Figure 2B:
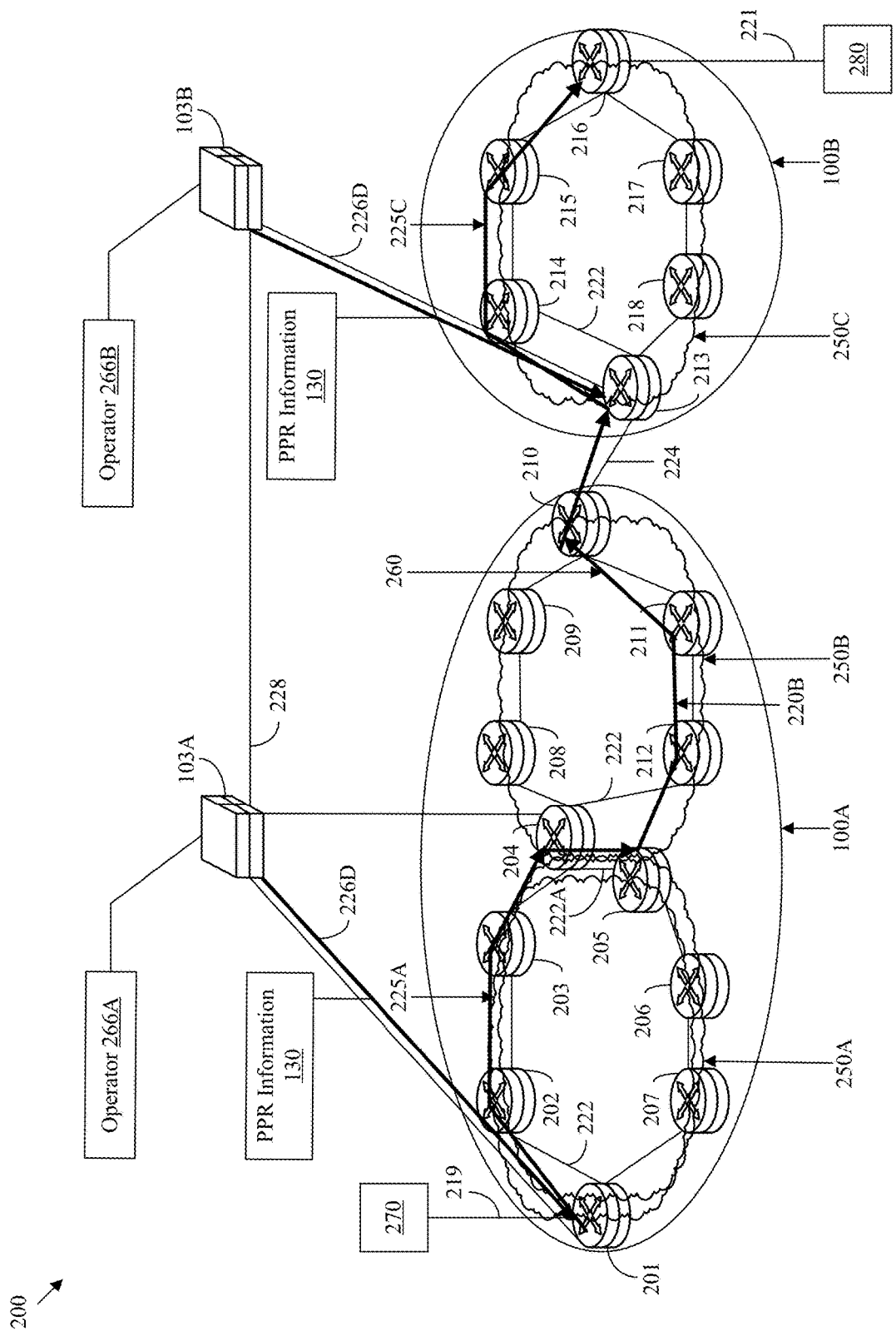

FIGS. 2A-B are diagrams illustrating a multi-domain network 200 configured to implement preferred path routing to construct an end-to-end path according to various embodiments of the disclosure. FIG. 2A is a diagram illustrating NEs within the multi-domain network 200 performing northbound communication with the central entities 103A-B. FIG. 2B is a diagram illustrating central entities 103A-B within the multi-domain network 200 provisioning an end-to-end path across the multi-domain network 200 and performing southbound communication with the NEs across the different domains.

FIG. 2A is a diagram of a multi-domain network 200 configured to implement preferred path routing according to various embodiments of the disclosure. Multi-domain network 200 includes a source 270, a destination 280, and multiple domains 100A-B, which are similar to the domain 100 described above with reference to FIG. 1. In an embodiment, each of domains 100A and 100B may be controlled by different operators or providers. As shown by FIG. 2A, the source 270 is interconnected to the NE 201 of domain 100A via link 219, and the destination 280 is interconnected to the NE 216 of domain 100B via link 221. Links 219 and links 221 may be similar to the links 160 described above with reference to FIG. 1.

As shown in FIG. 2A, domain 100A comprises two areas 250A-B, and domain 100B comprises a single area 250C. An area 250A-B refers to a particular subnetwork within the domain 100A-B, for example. Each of areas 250A-B may implement different transport protocols or similar transport protocols. In an embodiment, each of the areas 250A-B is an IGP area. For an area 250A-B that implements the IGP of IS-IS, the area 250A-B can be an IS-IS Level 1 (L1) area, an IS-IS Level 2 (L2) area, or an OSPF area. Area 250A-B may also be a non-zero OSPF area. In some cases, each area 250A-B may be included in one administrative domain, or autonomous system, implementing on BGP language. While FIG. 2A only shows a maximum of two areas within a domain 100A-B, it should be appreciated that a domain 100A-B may comprise any number of areas 250A-B.

Within domain 100A, the first area 250A includes NEs 201-207, and the second area 250B includes NEs 204-205 and 208-212. As shown by FIG. 2A, the first area 250A and the second area 250B both share two NEs 204-205 that are positioned between the two areas 250A-B within domain 100A. NEs 204-205 may be configured to operate within both areas 250A-B. NEs 201-212 within domain 100A are interconnected by intra-domain links 222, which are similar to the links 160 described above with reference to FIG. 1.

Within domain 100B, the third area 250C comprises NEs 213-218, which are also interconnected by intra-domain links 222. The NE 210 of the second area 250B is interconnected to the NE 213 of the third area 250C via an inter-domain link 224. The inter-domain link 224 is similar to the link 160 described above with reference to FIG. 1, except that the inter-domain link 224 is configured to interconnect devices (or NEs) within two different domains 100A-B. Therefore, the inter-domain link 224 is configured to transport data pursuant to the capabilities and protocols operated in both domains 100A and 100B, for example, using external BGP (BGP).

In an embodiment, the NEs 201-218 shown in FIG. 2A are similar to the NEs 150 and 154 described above with reference to FIG. 1. In an embodiment, each of NEs 201-218 may be topological NEs, which may be a physical device, such as a router, bridge, a network switch, or any other type of device, configured to perform switching and routing using the PPR mechanisms disclosed herein. In an embodiment, one or more of the NEs 201-218 may be non-topological NEs, such as, for example, a function, context, service, or a virtual machine.

In an embodiment, each of NEs 201-218 includes a memory that stores the LSDB and PPR information 130. As described above, each of the NEs 201-218 receives PPR information 130 from a headend NE, which receives the PPR information 130 from either an operator, the central entity 103, or another external entity.

Domain 100A further includes a central entity 103A, similar to the central entity 103 described above with reference to FIG. 1, except that central entity 103A is responsible for maintaining a topology of both areas 250A-B within the domain 100A. In an embodiment, at least one of the NEs 201-212 within an area 250A-B is configured with a protocol enabling northbound communication with the central entity 103A. For example, as shown in FIG. 2A, NE 203 of area 250A is configured as a BGP-LS speaker that is enabled with BGP-LS to perform northbound communications with the central entity 103A (transmitting data from the area 250A to the central entity 103A). In an embodiment, the northbound communications between NE 203 and the central entity 103A may be performed via link 226A, which may be a wired or wireless link or interface interconnecting NE 203 and the central entity 103A.

Similarly, NE 210 of area 250B is configured as a BGP-LS speaker that is enabled with BGP-LS to perform northbound communications with the central entity 103A (transmitting data from the area 250B to the central entity 103A). In an embodiment, the northbound communications between NE 210 and the central entity 103A may also be performed via link 226B, which may be a wired or wireless link or interface interconnecting NE 203 and the central entity 103A. While FIG. 2A only shows a single NE 201-212 within each area 250A-B performing northbound communication with the central entity 103A, one or more of the NEs 201-212 within each area 250A-B may be enabled to perform northbound communications with the central entity 103A. Central entity 103A is further configured to determine paths, both PPRs 220A-B and shortest paths 225A-B between two edge NEs within each of the areas 250A-B of domain 100A, as will be further described below.

Domain 100B further includes a central entity 103B, which is similar to the central entity 103A, except that central entity 103B is responsible for maintaining a topology of area 250C within the domain 100B. In an embodiment, at least one of the NEs within an area 250C is configured with a protocol enabling northbound communication with the central entity 103B. For example, as shown in FIG. 2A, NE 216 of area 250C is configured as a BGP-LS speaker that is enabled with BGP-LS to perform northbound communications with the central entity 103B (transmitting data from the area 250C to the central entity 103B). In an embodiment, the northbound communications between NE 216 and the central entity 103B may be performed via link 226C, which may be a wired or wireless link or interface interconnecting NE 216 and the central entity 103C.

While FIG. 2A only shows a single NE within each area 250C performing northbound communication with the central entity 103B, one or more of the NEs 213-218 within area 250C may be enabled to perform northbound communications with the central entity 103B. Central entity 103B is further configured to determine paths, both PPRs 220C and shortest paths 225C between two edge NEs within the area 250C of domain 100B, as will be further described below.

In an embodiment, each area 250A-C within a domain 100A-B is configured with both shortest paths 225A-C and PPRs 220A-C. In an embodiment, each of the NEs 201-218 in an area 250A-C may store LSDBs that indicate shortest paths 225A-C connecting edge NEs 201-218 within a respective area 250A-C. Supposing there are numerous intermediate NEs and links between each of the NEs 201-207 in area 250A, each of the NEs 201-207 stores a forwarding database or LSDB including shortest paths 225A between pairs of edge NEs 201-207 within area 250A. Similarly, supposing there are numerous intermediate NEs and links between each of the NEs 204-205 and 208-212 in area 250B, each of the NEs 204-205 and 208-212 stores a forwarding database or LSDB including shortest paths 225B between pairs of edge NEs 204-205 and 208-212 within area 250B. Further, supposing there are numerous intermediate NEs and links between each of the NEs 213-218 in area 250C, each of the NEs 213-218 stores a forwarding database or LSDB including shortest paths 225C between pairs of edge NEs 213-218 within area 250C.

The shortest path 225A-C may be computed using various algorithms or metrics that measure a value associated with one of the intra-domain links 222 and/or inter-domain link 224. For example, the predetermined shortest path 225A-C may be based on a collection of intra-domain links 222 on a path having the smallest metric or cost. The predetermined shortest path 225A-C may also be computed between two edge NEs 201-218 within an area 250A-C using Dijkstra's Shortest Path First (SPF) algorithm, or any other algorithm used to compute a path.

As described above, a PPR 220A-C is a custom path, that may or may not deviate from the pre-determined shortest path between two NEs 201-218 in an area 250A-C. The PPR 220A-C may be based on an application or server request for a path between two NEs 201-218 or between a source 270 and destination 280 that satisfies one or more network characteristics (such as TE characteristics obtained by the central entity 103 dynamically through BGP-LS or PCEP) or service requirements.

As shown in FIG. 2A, each of the areas 250A-C is configured with both a shortest path 225A-C and a PPR 220A-C. Within area 250A of domain 100A, the shortest path 225A includes a path between ingress NE 201, NE 202, NE 203, and egress NE 204, while the PPR 220A includes a path between ingress NE 201, NE 207, NE 206, and egress NE 205. Within area 250B of domain 100A, the shortest path 225B includes a path between ingress NE 204, NE 208, NE 209, and egress NE 210, while the PPR 220B includes a path between ingress NE 205, NE 212, NE 211, and egress NE 210. Within area 250C of domain 100B, the shortest path 225C includes a path between ingress NE 213, NE 214, NE 215, and egress NE 216, while the PPR 220C includes a path between ingress NE 213, NE 218, NE 217, and egress NE 216.

In an embodiment, PPR information 130 regarding the PPRs 220A-C within each of the areas 250A-C of the domains 100A-B may be received by each of the NEs 201-218 and stored at one of the NEs 201-218. As described above, an ingress or headend NE 201-218 may receive PPR information 130 regarding PPRs 220A-C from various sources, such as an operator of a domain 100A-B or any external entity.

In an embodiment, once the ingress or headend NE 201-218 receives the PPR information 130, the ingress or headend NE floods (e.g., transmits) the PPR information 130 to all of the other NEs 201-218 within the respective area 250A-C via the underlying IGP of the respective area 250A-C. For example, supposing NE 201 is an ingress or headend NE of the area 250A, NE 201 transmits the PPR information 130 to NEs 202-207 in area 250A. Supposing NE 204 is an ingress or headend NE of area 250B, NE 204 transmits the PPR information 130 to NEs 205 and 208-212 in area 250B. Supposing NE 213 is an ingress or headend NE of area 250C, NE 213 transmits the PPR information 130 to NEs 214-218 in area 250C.

In an embodiment, one the ingress or headend NE 201-218 receives the PPR information 130, the ingress or headend NE floods (e.g., transmits) the PPR information 130 to all of the other NEs 201-218 within the respective area 250A-B of the domain 100A-B via the underlying IGP of the respective domain 100A-B. For example, supposing NE 201 is an ingress or headend NE of the domain 100A, NE 201 transmits the PPR information 130 to NEs 202-207 in area 250A of domain 100A. Supposing NE 213 is an ingress or headend NE of domain 100B, NE 213 transmits the PPR information 130 to NEs 213-218 in domain 100B.

In an embodiment, the ingress NE 201-218 transmits the PPR information 130 to all the other NEs 201-218 in the area 250A-C and/or the domain 100A-B using an IGP flooding mechanism, such as OSPFv2, OSPFv3, or IS-IS. Examples of TLVs used to carry the PPR information 130 encoded as each of OSPFv2, OSPFv3, and IS-IS are shown and described below with reference to FIGS. 5-7.

In an embodiment, the PPR information 130 may include a PPR-ID identifying a PPR 220A-C and an ordered list of PPR-PDEs identifying a next hop on the PPR 220A-C. In an embodiment, the PPR-ID includes a single label or destination address describing and identifying the PPR 220A-C. For example, when a respective area 250A-C and/or a domain 100A-B implements SR-MPLS, the PPR-ID may be an MPLS label or an SID identifying a PPR 220A-C. When a respective area 250A-C and/or a domain 100A-B implements SRv6, the PPR-ID may be an SRv6 SID identifying a PPR. When a respective area 250A-C and/or a domain 100A-B implements IPv4, the PPR-ID may be an IPv4 address or prefix identifying a PPR 220A-C. Similarly, when a respective area 250A-C and/or a domain 100A-B implements IPv6, the PPR-ID may be an IPv6 address or prefix identifying a PPR.

As described herein, a PPR-PDE includes information identifying a next hop on the PPR 220A-C, which may be an NE 201-218, an intra-domain link 222, or a segment including both NEs 201-218 and intra-domain links 222. A next hop on the PPR 220A-C may hereinafter be referred to as an element 201-218 or intra-domain link 222, which may include an NE 201-218, an intra-domain link 222, or a segment including both NEs 201-218 and intra-domain links 222.

In an embodiment, the PPR-PDEs include details regarding one or more of the NEs 201-218 and/or intra-domain links 222 on the PPR 220A-C within an area 250A-C. In an embodiment, the PPR-PDEs include a sequential ordering of MPLS labels, IPV6 addresses, or IPv4 addresses that specify the actual path (e.g., one or more of the NEs 201-218 or intra-domain links 222) toward an egress NE 201-218 (also referred to herein as a "prefix").

After the PPR information 130 is advertised, each of the NEs 201-218 that received the PPR information is configured to compute and program the PPRs 220A-C on the data plane. In an embodiment, after the ingress or headend NE 201-218 transmits the PPR information 130 to other NEs 201-218 within the respective area 250A-C or domain 100A-B, each of the receiving NEs 201-218 first determines whether that particular NE 201-218 or an attached non-topological NE is identified in the PPR-PDEs of the PPR information 130. The receiving NEs 201-218 ignore the advertisement when the respective receiving NE 201-218 or associated non-topological NEs attached to or hosted by the respective receiving NE 201-218 is not identified in the PPR-PDEs of the PPR information 130.

In an embodiment, the NEs 201-218 receiving the advertisement that are identified in the PPR-PDEs of the PPR information 130 are each configured to update a local forwarding database to include an entry including the PPR information 130 for a destination address corresponding to an egress NE 201-218. In an embodiment, the NEs 201-218 are also configured to update a local forwarding database to include an entry including the PPR information 130 for a destination address corresponding to the egress NE 201-218 when an associated non-topological NE (attached to or hosted by the NE 201-218) is identified in the PPR-PDEs of the PPR information 130. In an embodiment, the local forwarding database is updated by adding another entry for a particular destination ID or address that includes the PPR-ID, each of the PPR-PDEs corresponding the PPR-ID, and/or an ID or address of the next node on the PPR 220A-C to which to forward a data packet.

In an embodiment, each of the NEs 201-218 may be configured to store the PPR information 130 in the forwarding database and/or the LSDB regardless of whether the respective NE 201-218 is identified in the PPR-PDEs of the PPR information 130. In this way, each of the NEs 201-218 maintains a topology of a respective area 250A-C or domain 100A-B and path related information regarding both shortest paths 225A-C and PPRs 220A-C.

In an embodiment, as described above, one or more NEs 201-218 within each of the areas 250A-C may be configured to communicate with a central entity 103A-B of a respective domain 100A-B. In an embodiment, the NEs 201-218 may be configured to implement a protocol that enables northbound communication between the NEs 201-218 and the central entity 103A-B, such as BGP-LS. As described above, NE 203 of area 250A is configured as a BGP-LS speaker that is enabled with BGP-LS to perform northbound communications with the central entity 103A, NE 210 of area 250B is configured as a BGP-LS speaker that is enabled with BGP-LS to perform northbound communications with the central entity 103A, and NE 216 of area 250C is configured as a BGP-LS speaker that is enabled with BGP-LS to perform northbound communications with the central entity 103B.

After having received the PPR information 130 encoded using an IGP, the NE 201-218 that is enabled as a BGP-LS speaker to communicate with the central entity 103A-B first determines the protocol ID 135 that identifies the IGP used to encode the received PPR information 130. Subsequently, the NE 201-218 generates an update 140A-C, including the received PPR information 130 and the protocol ID 135 identifying the IGP used to encode the received PPR information 130.

In an embodiment, the update 140A-C may be included as a portion of the BGP-LS Prefix Attribute or a portion of the BGP-LS Prefix NLRI, as described in IETF RFC 7752. In another embodiment, the update 140A-C may be an entirely new message for a new protocol or a protocol that is different from BGP-LS, configured to enable northbound communications.

As shown in FIG. 2A, NE 203 transmits an update 140A to the central entity 103A via link 226A. The update 140A comprises the PPR information 130 and a protocol ID 135 identifying the IGP used to encode the PPR information 130 in the update 140A. For example, suppose NE 203 received the PPR information 130 from ingress or headend NE 201, and the PPR information 130 is encoded using the IS-IS protocol. In this case, the update 140A comprises the PPR information 130 encoded according to the IS-IS protocol and a protocol ID 135 identifying the IS-IS protocol.

Similarly, NE 210 transmits an update 140B to the central entity 103A via link 226B. Similar to update 140A, update 140B also includes PPR information 130 and a protocol ID 135 identifying the IGP used to encode the PPR information 130 in the update 140B.

NE 216 transmits an update 140C to the central entity 103A via link 226C. Similar to update 140A, update 140C also includes PPR information 130 and a protocol ID 135 identifying the IGP used to encode the PPR information 130 in the update 140C.

In an embodiment, after the central entity 103A receives the update 140A-B and the central entity 103B receives the update 140C, the central entities 103A-B store the PPR information 130 within each of the updates 140A-C in a local database. In an embodiment, the central entities 103A-B may share the PPR information 130 contained in these updates 140A-C with one another when the central entities 103A-B are in a hierarchical relationship in which such sharing is permitted. As shown in FIG. 2A, the central entities 103A-B may share the PPR information 130 with one another via a link 228, which may be similar to link 160.

In an embodiment, the central entity 103A-B may filter some of the PPR information 130 before sharing the PPR information 130 with other central entities 130A-B in the multi-domain network 200. For example, the central entity 103A-B filters the PPR information according to various policies, as may be defined by the domain 100A-B. In an embodiment, the central entity 103A-B enables the BGP policy based filtering mechanism for inter-controller communication.

The embodiments for PPR information 130 distribution and maintenance disclosed herein enable NEs 201-218 within areas 250A-C of different domains 100A-B to communicate directly with a central entity 103A-B using a protocol that enables northbound communication, such as BGP-LS. As described below with reference to FIG. 2B, once the central entity 103A-B receives the PPR information 130, the central entity 103A-C is capable of provisioning end-to-end paths across the multi-domain network 200 and sending PPR information 130 back down to NEs 201-218 in the multi-domain network 200.

FIG. 2B is a diagram illustrating a central entities 103A-B provisioning an end-to-end path 260 across the multi-domain network 200 according to various embodiments of the disclosure. As described above with reference to FIG. 2A, after the central entities 103A-B receive the PPR information 130 describing PPRs 220A-C from the NEs 203, 210, and 216 in the updates 140A-C, respectively, the central entities 103A-B may store and/or update a locally stored database to include the PPR information 130. In some embodiments, the central entities 103A-B may receive PPR information 130 from other central entities 103A-B associated with different domains 100A-B in the multi-domain network 200. In this case, the central entities 103A-B may also store and/or update the locally stored database to include the PPR information 130 describing PPRs 220A-C in other domains 100A-B. The locally stored database of the central entities 103A-B may already store information regarding the shortest paths 225A-C (see FIG. 2A) for each of the areas 250A-C.

In an embodiment, each of the central entities 103A-B stores not just PPR information 130 describing PPRs 220A-C within the respective domain 100A-B, but also stores PPR information 130 describing PPRs 220A-C in other domains 100A-B in the multi-domain network 200. Therefore, although the central entity 103A is intended to operate as a controller of single domain 100A, and the central entity 103B is intended to operate as a controller of single domain 100B, the central entities 103A-B actually maintain information regarding the topology of both domains 100A-B and PPRs 220A-C present at both of the domains 100A-B. Therefore, according to various embodiments, when the central entity 103A receives a request to provision an end-to-end path 260 between a source 270 and a destination 280, the central entity 103A is configured to compute the end-to-end path 260 using not just the shortest paths 225A-C across the multi-domain network 200, but also the PPRs 220A-C across the multi-domain network 200.

As shown in FIG. 2B, the end-to-end path 260 between the source 270 and the destination 280 includes a combination of predetermined shortest paths 225A-C in the different areas 250A-C of the multi-domain network 200, and PPRs 220A-C in the different areas 250A-C of the multi-domain network 200. In particular, the end-to-end path 260 between the source 270 and the destination 280 includes the shortest path 225A in area 250A, the PPR 220B in the area 250B, and the shortest path 225C in area 250C. The shortest path 225A and the PPR 220B may be interconnected by the link 222A, and the PPR 220B and the shortest path 225C may be interconnected by the inter-domain link 224.

Therefore, embodiments of the present disclosure enable the central entities 103A-B in a multi-domain network 200 to determine an end-to-end path 260 between a source 270 and destination 280 using not only the shortest paths 225A-C within the domains 100A-B of the multi-domain network 200, but also the configured PPRs 220A-C within the domains 100A-B of the multi-domain network 200. In this way, the embodiments of the present disclosure enable end-to-end paths 260 to be customized as a whole and within each area 250A-C of the domains 100A-B within the multi-domain network 200.

In an embodiment, end-to-end path information regarding the end-to-end paths 260 may also be transmitted from the central entities 103A-B to one or more NEs 201-218 in the domains 100A-B. The end-to-end path information may be transmitted from the central entities 103A-B to the NEs 201-218 using a message 144 encoded as according to BGP-LS.

In an embodiment, the central entity 103A-B determines new PPR information 130 or modifies the original PPR information 130 locally stored at the central entity 103A-B. For example, operators 266A-B may input additional information, such as application or service requirements, that the central entity 103A-B uses to determine new PPR information 130 describing new PPRs 220A-C that are to be provisioned at areas 250A-C. For example, operator 266A may be responsible for controlling the central entity 103A and domain 100A, and thus, may input information as required to provision additional PPRs 220A-C at areas 250A-B. Similarly, operator 266B may be responsible for controlling the central entity 103B and domain 100B, and thus, may input information as required to provision additional PPRs 220A-C at area 250C. After receiving this information from the operator 266A-B, the central entity 103A-B determines new PPR information 130 that is sent back down to the areas 250A-C. The central entity 103A-B transmits this new PPR information 130 to one or more of the NEs 201-218 in each area 250A-C and/or domain 100A-B via links 226D-E, respectively. The new PPR information 130 may be transmitted from the central entities 103A-B to the NEs 201-218 using a message 144 encoded as according to BGP-LS.

After receiving the end-to-end path information and/or newly created or modified PPR information 130, the receiving NE 201-218 may again flood (e.g., transmit) the end-to-end path information and/or newly created or modified PPR information 130 to all the other NEs 201-218 in the respective area 250A-C and/or domain 100A-B. The other NEs 201-218 are each configured to update a local forwarding database to indicate the end-to-end path information and/or newly created or modified PPR information when a respective NE 201-218 is identified in the end-to-end path information and/or newly created or modified PPR information. After updating the forwarding databases, the NEs 201-218 are configured to forward data packets according to the information stored at the forwarding database.

According to various embodiments, the configuring of one or more NEs in a domain 100A-B to forward PPR information 130 to an associated central entity 103A-B using the BGP-LS enables the central entity 103A-B in a multi-domain network 200 to customize an end-to-end path 260 between a source 270 and destination 280 based on various factors or application requirements. In this way, the methods, apparatuses, and systems for PPR information 130 distribution and maintenance disclosed herein enable a more effective and accurate mechanism for path provisioning across multi-domain networks 200.

Figure 3:
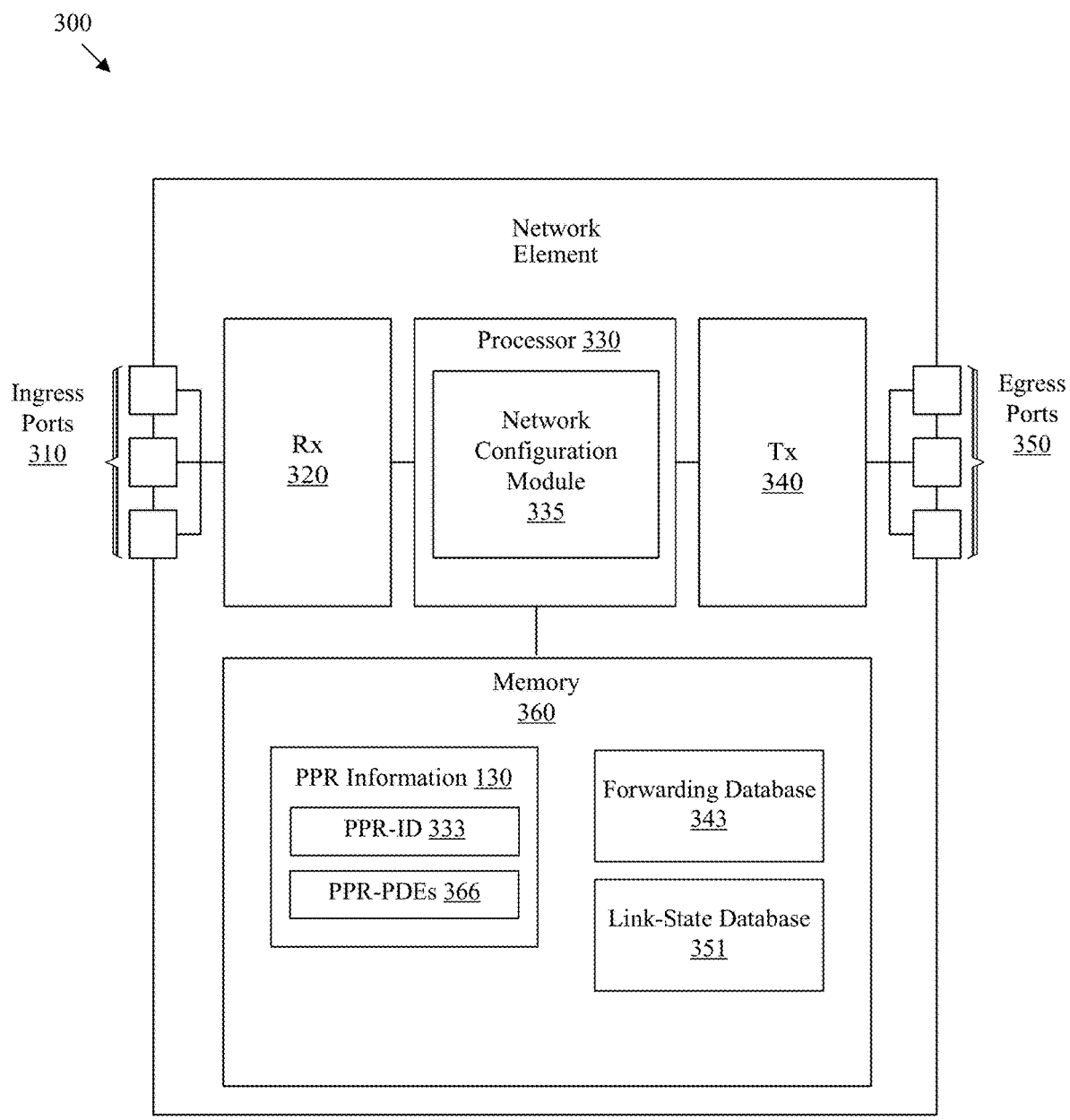
FIG. 3 is an embodiment of an NE in a network configured to implement preferred path routing according to various embodiments of the disclosure.

FIG. 3 is a diagram of an embodiment of an NE 300 in a network such as the domain 100 or multi-domain network 200. NE 300 may be implemented as the central entity 103A-B or the NEs 201-218. The NE 300 may be configured to implement and/or support the routing mechanisms described herein. The NE 300 may be implemented in a single node or the functionality of NE 300 may be implemented in a plurality of nodes. One skilled in the art will recognize that the term NE encompasses a broad range of devices of which NE 300 is merely an example. The NE 300 is included for purposes of clarity of discussion, but is in no way meant to limit the application of the present disclosure to a particular NE embodiment or class of NE embodiments. At least some of the features and/or methods described in the disclosure may be implemented in a network apparatus or module such as NE 300. For instance, the features and/or methods in the disclosure may be implemented using hardware, firmware, and/or software installed to run on hardware. As shown in FIG. 3, the NE 300 comprises one or more ingress ports 310 and a receiver unit (Rx) 320 for receiving data, at least one processor, logic unit, or central processing unit (CPU) 330 to process the data, transmitter unit (Tx) 340 and one or more egress ports 350 for transmitting the data, and a memory 360 for storing the data.

The processor 330 may comprise one or more multi-core processors and be coupled to a memory 360, which may function as data stores, buffers, etc. The processor 330 may be implemented as a general processor or may be part of one or more application specific integrated circuits (ASICs) and/or digital signal processors (DSPs). The processor 330 may comprise a network configuration module 335, which may perform processing functions of the central entity 103 or the NEs 201-218. The network configuration module 335 may also be configured to perform the steps of method 800, and/or any other method discussed herein. As such, the inclusion of the network configuration module 335 and associated methods and systems provide improvements to the functionality of the NE 300. Further, the network configuration module 335 effects a transformation of a particular article (e.g., the network) to a different state. In an alternative embodiment, network configuration module 335 may be implemented as instructions stored in the memory 360, which may be executed by the processor 330.

The memory 360 may comprise a cache for temporarily storing content, e.g., a random-access memory (RAM). Additionally, the memory 360 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory 360 may be configured to store the PPR information 130, the end-to-end path information, a forwarding database 343, and an LSDB 351. The PPR information 130 includes PPR-IDs 333 and the PPR-PDEs 366, as will be further described below with reference to FIGS. 4-7. The forwarding database 343 stores entries describing forwarding rules for how a particular NE 300 (e.g., NE 201-218 of FIG. 2) should forward a data packet that includes a PPR-ID 333 and/or a destination address. The LSDB 351 includes information describing a topology of each of the domains 100A-B and areas 250A-C within the domains 100A-B.

It is understood that by programming and/or loading executable instructions onto the NE 300, at least one of the processor 330 and/or memory 360 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC in a particular machine or apparatus, likewise a computer that has been programmed and/or loaded with executable instructions may be viewed as a particular machine or apparatus. In some embodiments, the NE 300 may be configured to implement OSPFv2, OSPFv3, IS-IS, or direct SDN controller based on network implementations.

FIG. 4A shows a diagram illustrating an example of an update 140A-C (hereinafter referred to as "update 140") that includes PPR information 130 (see FIGS. 1 and 2A-B) and is sent to the central entity 103A-B (hereinafter referred to as "central entity 103"). In an embodiment, the update 140 may also be sent from the central entity 103 to a headend NE 201-218, as described above with reference to the southbound communications.

In an embodiment, a headend NE 201-218 in each of the areas 250A-C transmits the PPR information 130 to the central entity 103. In an embodiment, the headend NE 201-218 transmits the PPR information 130 in the update 140 shown in FIG. 4A. Continuing with the example described above with reference to FIGS. 2A-B, the headend NE 203 of area 250A sends the PPR information 130 to the central entity 103A, in which this PPR information 130 describes the PPR 220A. In an embodiment, the PPR information 130 sent by the headend NE 203 comprises a PPR-ID 333 identifying the PPR 220A and a plurality of PPR-PDEs 366, each describing one of the NEs 201, 207, 206 or 205 on the PPR 220A. Similarly, the headend NE 210 of area 250B sends the PPR information 130 to the central entity 103A, in which this PPR information 130 describes the PPR 220B. In an embodiment, the PPR information 130 sent by the headend NE 210 comprises a PPR-ID 333 identifying the PPR 220B and a plurality of PPR-PDEs 366, each describing one of NEs 205, 212, 211, or 210 on the PPR 220B. The headend NE 216 of area 250C sends the PPR information 130 to the central entity 103B, in which this PPR information 130 describes the PPR 220C. In an embodiment, the PPR information 130 sent by the headend NE 216 comprises a PPR-ID 333 identifying the PPR 220C and a plurality of PPR-PDEs 366, each describing one of the NEs 213, 218, 217 or 216 on the PPR 220C.

The diagram shown in FIG. 4A is a TLV of the update 140 showing at least a portion of the different fields that are included in the update 140. In an embodiment, the fields of the update 140 shown in FIG. 4A may be included in a BGP-LS prefix NLRI's BGP-LS prefix attribute TLV, as described in IETF RFC 7752. As shown in FIG. 4A, the update 140 includes a type field 403, a length field 406, a PPR flags field 409, an address family (AF) field 412, reserved bits 413, and one or more PPR sub-TLVs 415.

The type field 403 may include, for example, a value indicating that the update 140 includes the PPR information 130 encoded into the PPR sub-TLVs 415. In an embodiment, the value is assigned by the Internet Assigned Numbers Authority (IANA). The length field 406 is a variable field indicating a size of the update 140. The PPR flags field 409 varies depending on the IGP used to encode the PPR information 130 in the PPR sub-TLVs 415. More details regarding the PPR flags field 409 will be shown and described below with reference to FIGS. 5A, 6A, and 7A, which each describe the PPR flags field 409 with respect to a different IGP. The AF field 412 includes a value indicating an address family for the prefix or destination address of an egress or headend NE of the PPR 220A-C being described by the update 140. The reserved bits 413 include 1 octet that should be set to 0 and ignored upon receipt. The PPR sub-TLVs 415 include multiple TLVs, which will be further described below with reference to FIG. 4B and FIGS. 5-7. In an embodiment, the PPR sub-TLVs 415 carry the PPR information 130, which may include the PPR-ID 333 and the PPR-PDEs 366.

FIG. 4B is a diagram illustrating the contents of the PPR sub-TLVs 415 carried in the update 140 according to various embodiments of the disclosure. As shown in FIG. 4B, the PPR sub-TLVs 415 includes a prefix field 418 (shown as the PPR-prefix Sub-TLV in FIG. 4B) (also referred to herein as an "FEC/prefix field"), a PPR-ID field 421 (shown as the PPR-ID Sub-TLV in FIG. 4B), a PPR-PDEs field 427 (shown as the PPR-PDE Sub-TLV in FIG. 4B) (also referred to herein as a "path field"), and an attributes field 430 (shown as PPR-attribute Sub-TLV in FIG. 4B). While the PPR sub-TLVs 415 is only shown to include these fields, it should be appreciated that the PPR sub-TLVs 415 may include any additional fields as necessary to include information regarding the PPR 220A-C within areas 250A-C of a multi-domain network 200.

Figure 5B:
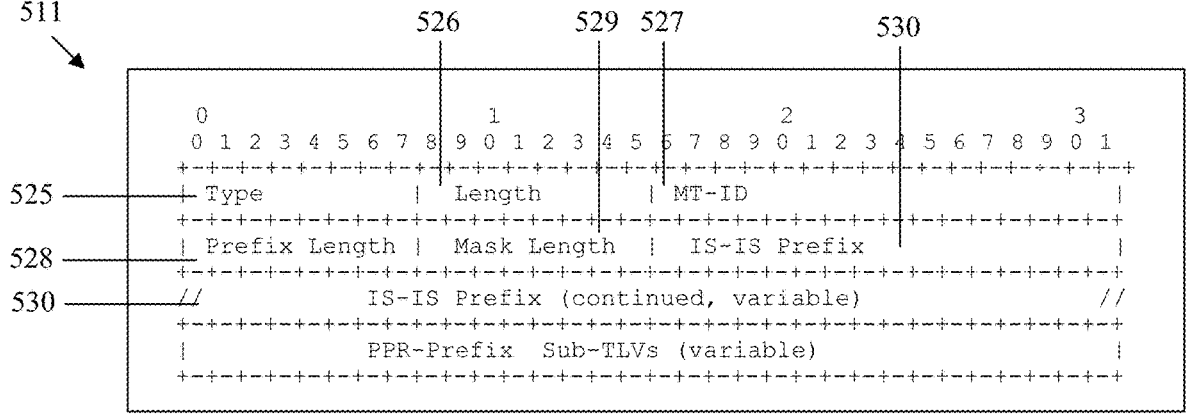

The prefix field 418 may carry an address, label, or ID of a destination 280 or an egress NE 201-218 on a PPR 220A-C described by the update 140. The prefix field 418 varies depending on the IGP implemented by the NEs 201-218 within a domain 100A-B. Thus, the prefix field 418 also varies depending on the protocol ID 135, which is included in the BGP NLRI that contains the update 140. Examples of various prefix fields 418 based on various IGPs are defined below with reference to FIGS. 5B, 6B, and 7B. FIG. 5B illustrates a prefix field 418 used in a domain 100A-B implementing the IGP of IS-IS, FIG. 6B illustrates a prefix field 418 used in a domain 100A-B implementing the IGP of OSPFv2, and FIG. 7B illustrates a prefix field 418 used in a domain 100A-B implemented the IGP of OSPv3.

The PPR-ID field 421 may carry a PPR-ID 333. The PPR-ID 333 is the ID that uniquely identifies a PPR 220A-C. In an embodiment, the PPR-ID 333 may be generated by the central entity 103 and sent to the ingress NEs 201-218. In another embodiment, ingress NEs 201-218 may be configured to generate the PPR-ID 333 for each of the PPRs 220A-C defined in a message received from the central entity 103.

Figure 5C:
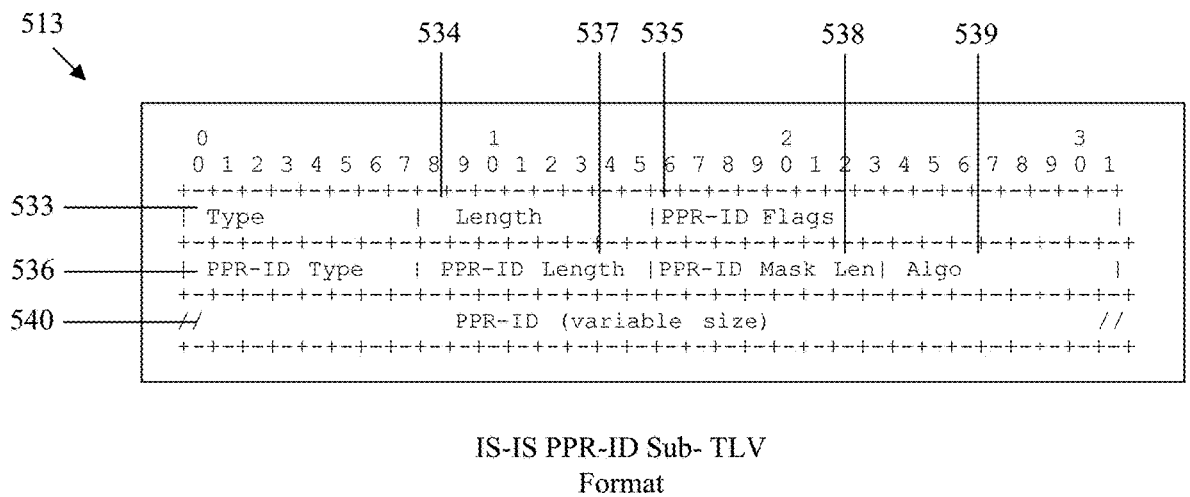
Figure 5D:
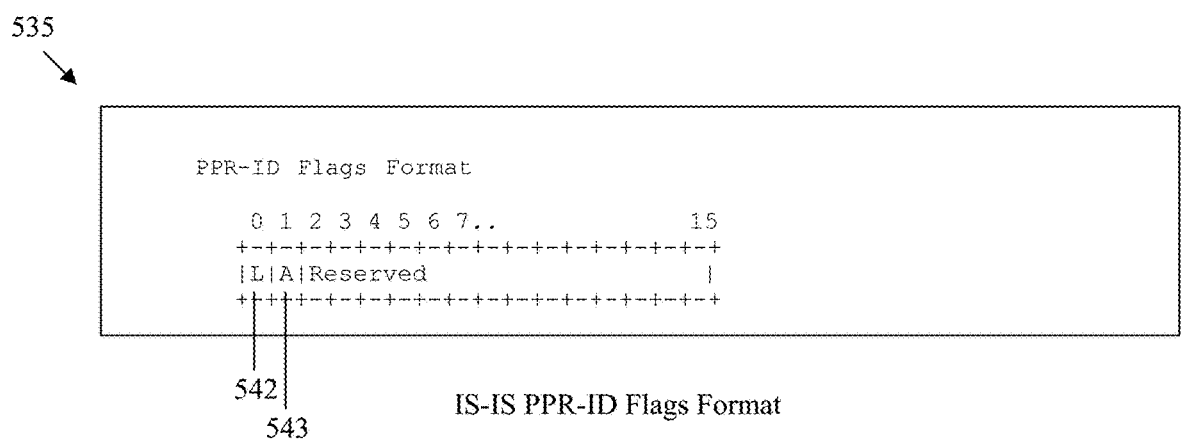

The PPR-ID field 421 varies depending on the IGP implemented by the NEs 201-218 within a domain 100A-B. Thus, the PPR-ID field 421 also varies depending on the protocol ID 135, which is included in the BGP NLRI that contains the update 140. Examples of various PPR-ID fields 421, and fields within the PPR-ID field 421, are defined below with reference to FIGS. 5C-D, 6C-D, and 7C-D. FIG. 5C-D illustrates a PPR-ID field 421, and fields with the PPR-ID field 421, used in a domain 100A-B implementing the IGP of IS-IS, FIG. 6C-D illustrates a PPR-ID field 421, and fields with the PPR-ID field 421, used in a domain 100A-B implementing the IGP of OSPFv2, and FIG. 7C-D illustrates a PPR-ID field 421, and fields with the PPR-ID field 421, used in a domain 100A-B implemented the IGP of OSPv3.

In an embodiment, the PPR-PDEs field 427 includes labels, addresses, or identifiers of one or more of the elements 201-218 or 222 (e.g., NEs 201-218 or intra-domain links 222) on the PPR 220A-C being described by the PPR sub-TLV 415. The PPR-PDEs field 427 includes a sub-field PPR-PDE field for each element 201-218 or 222 identified as being on the PPR 220A-C. Each PPR-PDE field 427 includes a label, address, or ID for one or more of the elements 201-218, 222, 224 on the PPR 220A-C. The label, address, or ID is encoded according to a PPR type indicated by the PPR type field, defining how the labels, addresses, or IDs of the elements 201-218 or 222 on the PPR 220A-C are encoded in the PPR-PDEs field 427.

Figure 5E:
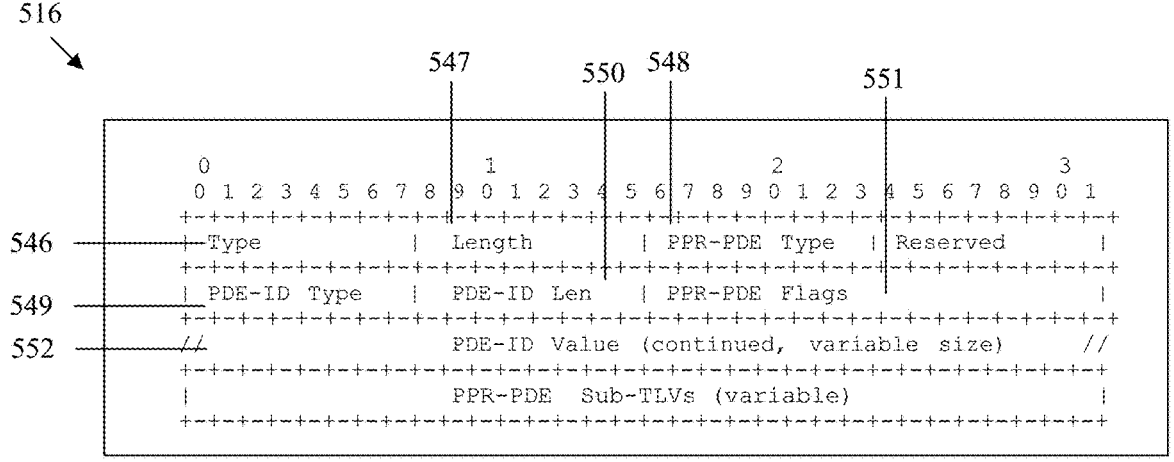
Figure 5F:
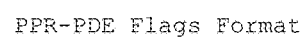

The PPR-PDEs field 427 varies depending on the IGP implemented by the NEs 201-218 within a domain 100A-B. Thus, the PPR-PDEs field 427 also varies depending on the protocol ID 135, which is included in the BGP NLRI that contains the update 140. Examples of various PPR-PDEs field 427, and fields within the PPR-PDE field 427, are defined below with reference to FIGS. 5E-F, 6E-F, and 7E-F. FIG. 5E-F illustrates a PPR-PDE field 427, and fields within the PPR-PDE field 427, used in a domain 100A-B implementing the IGP of IS-IS, FIG. 6E-F illustrates a PPR-PDE field 427, and fields within the PPR-PDE field 427, used in a domain 100A-B implementing the IGP of OSPFv2, and FIG. 7E-F illustrates a PPR-PDE field 427, and fields within the PPR-PDE field 427, used in a domain 100A-B implemented the IGP of OSPv3.

The attributes field 430 may include additional features that are used to regulate traffic across NEs 201-218 in the areas 250A-C of the multi-domain network 200. In an embodiment, the attributes field 430 carries traffic accounting parameters that is agnostic to protocols (OSPFv2, OSPFv3, ISIS, or SDN based direct programming the forwarding). For example, the traffic accounting parameters are further described in the draft document entitled "Traffic Accounting for MPLS Segment Routing Paths," by S. Hedge, dated Oct. 30, 2017.

FIG. 4C is a diagram illustrating an example of the PPR information 130 carried in the update 140 and PPR-sub TLV 415 described with reference to FIGS. 4A-B according to various embodiments of the disclosure. As shown in FIG. 4C, the PPR information 130 includes the PPR-ID 333, a PPR-type 443, and one or more PPR-PDEs 366A-N. It should be appreciated that the PPR information 130 shown in FIG. 4C may only be a portion of the information regarding one or more PPRs 220A-C that are transmitted in update 140.

The PPR-ID 333 is an ID that uniquely identifies a PPR 220A-C. In an embodiment, the PPR-ID 333 is carried in the PPR-ID field 421 of the update 140. The PPR-type 443 defines how the labels, addresses, or IDs of one or more of the elements 201-218 and 222 (NEs 201-218 and links 222) on the PPR 220A-C are encoded in the PPR-PDEs field 427.

The PPR-PDEs 366A-N each include a label, address, or ID representing one or more of the elements 201-218 and 222 on the PPR 220A-C being described in the update 140. In an embodiment, an update 140 may describe a strict PPR 220A by including PPR-PDEs 366A-N for every single NE 201, 207, 206, and 205 on a PPR 220A. For example, the first PPR 220A can be described as a strict PPR 220A by including PPR-PDEs 366A-D, in which PPR-PDE 366A includes an address of NE 201, PPR-PDE 366B includes an address of NE 207, PPR-PDE 366C includes an address of NE 206, and PPR-PDE 366D includes an address of NE 205. In this way, the strict PPR 220A is advertised by including an address of every single NE 201, 207, 206, and 205 on the PPR 220A.

In an embodiment, an update 140 may describe a loose PPR 220B by including PPR-PDEs 366A-N for a subset of the elements 205, 212, 211, and 210 on the PPR 220B. For example, the second PPR 220B can be advertised as a loose PPR 220B by including PPR-PDEs 366A-D, in which PPR-PDE 366A includes an address of NE 205, PPR-PDE 366B includes an address of NE 212, and PPR-PDE 366C includes an address of NE 210. In this way, the loose PPR 220B includes an address of only a subset of the NEs on the PPR 220B because the PPR-PDEs 366A-N excludes an address of NE 211.

FIGS. 5A-F, FIGS. 6A-F, and FIGS. 7A-F are diagrams illustrating examples of the information carried in the update 140 and PPR sub-TLVs 415 according to various different protocols. Specifically, FIGS. 5A-F are diagrams illustrating examples of the PPR sub-TLVs 415 within the update 140, and fields within the PPR sub-TLVs 415 according to IS-IS, FIGS. 6A-F are diagrams illustrating examples of PPR sub-TLVs 415 within the update 140, and fields within the PPR sub-TLVs 415 according to OSPFv2, and FIGS. 7A-F are diagrams illustrating examples of the PPR sub-TLVs 415 within the update 140, and fields within the PPR sub-TLVs 415 according to OSPFv3.

FIGS. 5A-F are diagrams illustrating examples of the PPR sub-TLVs 415 within the update 140, and fields within the PPR sub-TLVs 415 encoded according to IS-IS. While some aspects of update 140 encoded according to IS-IS are described below with reference to FIGS. 5A-F, the additional details regarding the update 140 encoded according to OSPFv2 IS-IS is defined in the LSR Working Group Draft Document entitled "Preferred Path Routing (PPR) in IS-IS," dated Jul. 2, 2018, by U. Chunduri, et. al. (hereinafter referred to as the "PPR IS-IS Document").

Figure 5A:
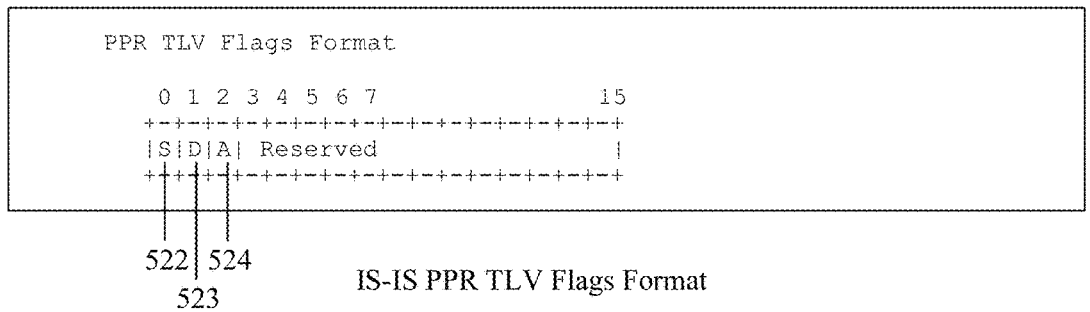
FIGS. 5A-F, FIGS. 6A-F, and FIGS. 7A-F are diagrams illustrating examples of the update and fields within the update according to various different protocols.

FIG. 5A is a diagram illustrating the PPR flags field 509 included in the PPR flags field 409 of an update 140 encoded according to IS-IS according to various embodiments. The PPR flags field 509 may include three different flags 522, 523, and 524. The S flag 522, labelled as "S" in FIG. 5A, indicates that, if set, the update 140 including the PPR sub-TLVs 415 should be flooded across the entire routing domain 100A-B or area 250A-C. If the S flag 522 is not set, then the update 140 including the PPR sub-TLVs 415 is not be leaked between IS-IS levels.

The D flag 523, labelled as "D" in FIG. 5A, indicates that when the update 140 including the PPR sub-TLVs 415 is leaked from IS-IS level-2 to level-1, the D bit 523 may be set. Otherwise, the D bit 523 may be clear. The update 140 including the PPR sub-TLVs 415 with the D bit 523 may not be permitted to be leaked from level-1 to level-2.

The A flag 524, labelled as "A" in FIG. 5A, indicates that the prefixes and PPR-IDs 333 advertised in the update 140 including the PPR sub-TLVs 415 are directly connected to the originators of the update 140. If the A flag 524 is not set, any other NE 201-218 in the domain 100A-B or area 250A-C may forward the update 140 on behalf of the originating node of the update 140. As shown by FIG. 5A, the PPR flags field 509 includes reserved bits that are reserved for future use, should be set to 0, and ignored upon reception.

FIG. 5B is a diagram illustrating the PPR-Prefix sub-TLV 511 included in the PPR sub-TLV 415 of the update 140 and encoded according to OSPFv2 according to various embodiments. The PPR-Prefix sub-TLV 511 is similar to the prefix field 418, except that the PPR-Prefix sub-TLV 511 is encoded according to IS-IS. The PPR-Prefix sub-TLV 511 is a variable size sub-TLV describing the prefix or destination address of the destination 280 or egress NEs 201-218 of the PPR 220A-C. The PPR-Prefix sub-TLV 511 includes a type field 525, a length field 526, an MT-ID field 527, a prefix length field 528, a mask length field 529, and an IS-IS prefix field 530. The type field 525 may include a value assigned by the IANA indicating a type of the PPR-Prefix sub-TLV 511. The length field 526 includes a total length of the value field in bytes. The MT-ID field 527 includes a multi-topology identifier, in which the four most significant bits are set to 0 on transmit and ignored upon reception. The remaining 12 bit field carries the multi-topology identifier.

The prefix length field 528 includes the length of the prefix or destination address of the egress NE 201-218 or destination 280 in bytes. The mask length field 529 includes a length of the prefix in bits, in which only the most significant octets of the prefix are encoded. The IS-IS prefix field 530 includes the IS-IS prefix or destination address, which may refer to the tail-end egress NE 201-208 of the PPR 220A-C or the destination 280 of the PPR 220A-C. The value of the IS-IS prefix field 530 is 4 octets when the prefix is an IPv4 address and 16 octets when the prefix is an IPv6 address.

FIG. 5C is a diagram illustrating the PPR-ID sub-TLV 513 included in an update 140 and encoded according to IS-IS according to various embodiments. The PPR-ID sub-TLV 513 is similar to the PPR-ID field 421, except that the PPR-ID sub-TLV 513 is encoded according to IS-IS. The PPR-ID sub-TLV 513 is a variable size sub-TLV defining a PPR-ID 333 of the PPR 220A-C. The PPR-ID sub-TLV 513 includes a type field 533, a length field 534, a PPR-ID flags field 535, a PPR-ID type field 536, a PPR-ID length field 537, a PPR-ID mask length field 538 (shown in FIG. 5D as "PPR-ID Mask Len"), an algorithm field 539 (shown in FIG. 5D as "Algo"), and a PPR-ID field 540.

The type field 533 includes a value assigned by the IANA indicating a type of the PPR-ID sub-TLV 513. The length field 534 includes a total length of the value field in bytes. The PPR-ID flags field 535 is a 2 octet field for flags, which will be further described below with reference to FIG. 5D.

The PPR-ID type field 536 includes a value indicating a data plane type of the PPR-ID 333 being described. For example, a value of 1 may indicate a data plane type of MPLS/SID Label, a value of 2 may indicate a data plane type of native IPv4 addresses or prefixes, a value of 3 may indicate a data plane type of native IPv6 addresses or prefixes, and a value of 4 may indicate a data plane type of IPv6 SID in SRv6 with SRHs. The PPR-ID length field 537 includes a length of the PPR-ID field 540 in octets and may depend on the PPR-type 443 included in the PPR-ID type field 536. The PPR-ID mask length field 538 may only be applicable for certain PPR-types 443, such as types 2, 3, and 4 listed above, and may include the length of the PPR-ID 333 in bits. The algorithm field 539 is a 1 octet value representing the SPF algorithm used to calculate the shortest path 225A-C between the source 270 and the destination 280.

The PPR-ID field 540 includes the PPR-ID 333 of the PPR 220A-C. The value of the PPR-ID 333 is variable and depends on the PPR-type 443. When the PPR-type 443 is an MPLS SID/Label, then the PPR-ID 333 is also an MPLS SID/Label. When the PPR-type 443 is native IPv4, then the PPR-ID 333 is a 4 byte IPv4 address. When the PPR-type 443 is native IPv4, then the PPR-ID 333 is a 16 byte IPv6 address. When PPR-type 443 is IPv6 SID in SRv6, then the PPR-ID 333 is an IPv6 SID.

FIG. 5D is a diagram illustrating the PPR-ID flags field 535 of the PPR-ID sub-TLV 513, which is included in an update 140 and encoded according to IS-IS according to various embodiments. The PPR-ID flags field 535 may include two different flags 542 and 543. The L flag 542, labelled as "L" in FIG. 5D, indicates that, if set, then the PPR 220A-C being described includes a loose-PPR 220A-B in which only a subset of the elements 201-218 or 222 (NEs 201-218 or links 222) of the PPR 220A-C is identified in the update 140. If the L flag 542 is not set, then the PPR 220A-C being described is a strict-PPR 220A-C in which all of the NEs 201-218 of the PPR 220A-C are identified in the update 140. In an embodiment, a strict-PPR 220A-C lists every single node or adjacency in the PPR 220A-C. In an embodiment, a strict-PPR 220A-C lists every single intra-domain link 222 in the PPR 220A-C.

The A flag 543, labelled as "A" in FIG. 5D, indicates that, if set, all non-PPR nodes in the IS-IS area/domain may add a forwarding information database (FIB) (also referred to herein as the "forwarding database") entry for the PPR-ID 333 with the next element set to the shortest path next element 201-218 (NE 201-218 or intra-domain link 222) for the prefix being described. The next element may refer to the next segment, next hop, next link, next label, next function, next context, etc., on the PPR 220A-C. As shown by FIG. 5D, the PPR PPR-ID flags field 535 includes reserved bits that are reserved for future use, should be set to 0, and ignored upon reception.

FIG. 5E is a diagram illustrating the PPR-PDE sub-TLV 516 included in the PPR sub-TLV 415 of the update 140 and encoded according to IS-IS according to various embodiments. The PPR-PDE sub-TLV 516 is similar to the PPR-PDEs field 427, except that the PPR-PDE sub-TLV 516 is encoded according to IS-IS. In an embodiment, each of the PPR-PDEs 427 may include the PPR-PDE sub-TLV 516 for each element on the PPR 220A-C being described. The PPR-PDE sub-TLV 516 includes a type field 546, a length field 547, a PPR-PDE type field 548, a PDE-ID type field 549, a PDE-ID length field 550, a PPR-PDE flags field 551, and a PDE-ID value field 552. The type field 546 may include a value assigned by the IANA indicating a type of the PPR-Prefix sub-TLV 511. The length field 547 includes a total length of the value field in bytes.

The PPR-PDE type field 548 includes a value representing a type of the element 201-218 and 222 (NEs 201-218 and intra-domain link 222) being identified in the PPR-PDE sub-TLV 516 (e.g., whether the element 201-218 and 222 is a topological NE or a non-topological NE). For example, the value of 1 may indicate that the element 201-218 and 222 being identified in the PPR-PDE sub-TLV 516 is a topological NE 201-218 or an intra-domain link 222, and the value of 2 may indicate that the element 201-218 or 222 being identified in the PPR-PDE sub-TLV 516 is a non-topological NE.

The PDE-ID type field 549 may be an octet including a value indicating a PDE-forwarding ID type. For example, the value of 1 may indicate that the PDE-forwarding ID type is an SID/label, the value of 2 may indicate that the PDE-forwarding ID type is an SR-MPLS prefix SID, the value of 3 may indicate that the PDE-forwarding ID type is an SR-MPLS adjacency SID, a value of 4 may indicate that the PDE-forwarding type is an IPv4 address, a value of 5 may indicate that the PDE-forwarding type is an IPv6 address, a value of 6 may indicate that the PDE-forwarding type is an SRv6 node SID, and a value of 7 may indicate that the PDE-forwarding type is an SRv6 adjacency SID. The PDE-ID length field 550 may include a length of the PDE-forwarding ID type included in the PDE-ID type field 549.

The PPR-PDE flags field 551 is a 2 octet bit field of flags, which is further described below with reference to FIG. 5F. The PDE-ID value field 552 includes a label, address, or ID of the element 201-218 and 222 (NEs 201-218 and intra-domain link 222) being identified in the PPR-PDE sub-TLV 516 and is encoded based on the PDE-forwarding ID type included in the PDE-ID type field 549.

FIG. 5F is a diagram illustrating the PPR-PDE flags field 551 of the PPR-PDE sub-TLV 516, which is included in an update 140 encoded according to IS-IS according to various embodiments. The PPR-PDE flags field 551 may include two different flags 556 and 557. The L flag 556, labelled as "L" in FIG. 5F, indicates the type of the next topological PDE-ID in the PPR-PDEs listed in the PPR-PDE sub-TLV 516. In an embodiment, if the L flag 556 is set, then the next topological NE 201-218 corresponding to the next topological PDE-ID is loose (may not be the direct next element attached to the current NE on the PPR advertised). In this embodiment, if the L flag 556 is not set, then the next topological NE 201-218 corresponding to the next topological PDE-ID is strict (may be the direct next element attached to the current NE on the PPR advertised).

The D flag 557, labelled as "D" in FIG. 5F, is by default unset, unless the PPR-PDE type is 1 (indicating that the next element is a topological element). As shown by FIG. 5E, the PPR-PDE flags field 551 includes reserved bits that are reserved for future use, should be set to 0, and ignored upon reception.

FIGS. 6A-F are diagrams illustrating examples of PPR sub-TLVs 415 within the update 140, and fields within the PPR sub-TLVs 415 encoded according to OSPFv2. While some aspects of update 140 encoded according to OSPFv2 are described below with reference to FIGS. 6A-F, additional details regarding the update 140 encoded according to OSPFv2 is further defined in the LSR Working Group Draft Document entitled "Preferred Path Routing (PPR) in OSPF," dated Jul. 2, 2018, by U. Chunduri, et. al. (hereinafter referred to as the "PPR OSPF Document").

Figure 6A:
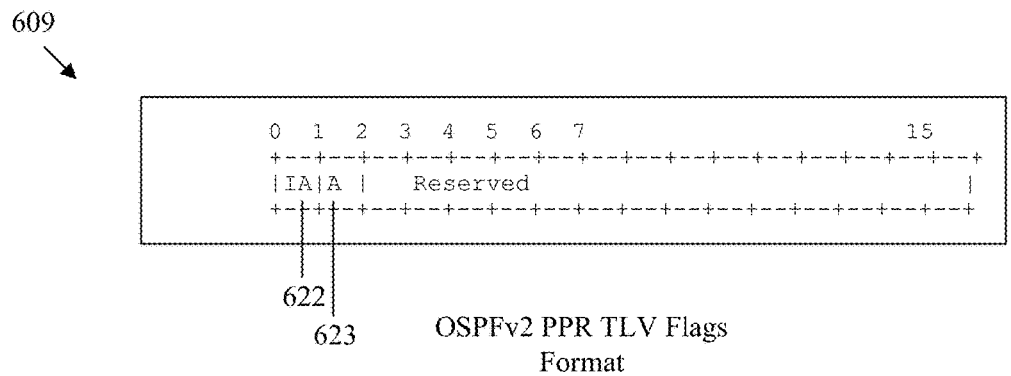
Figure 6B:
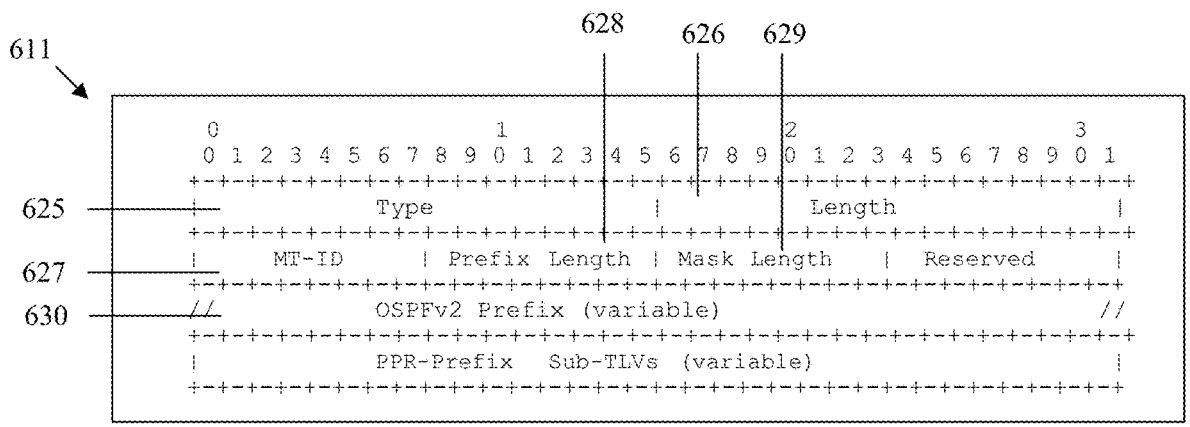
Figure 6C:
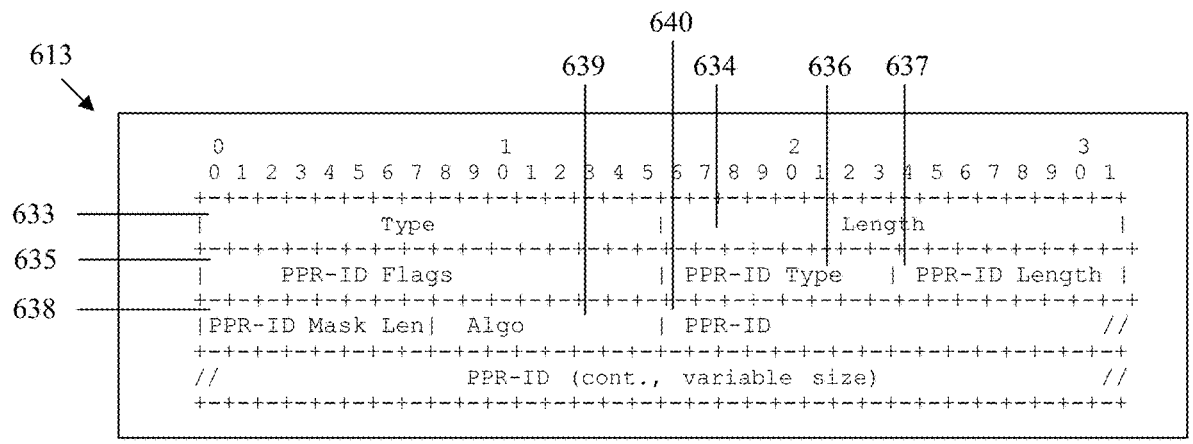
Figure 6D:
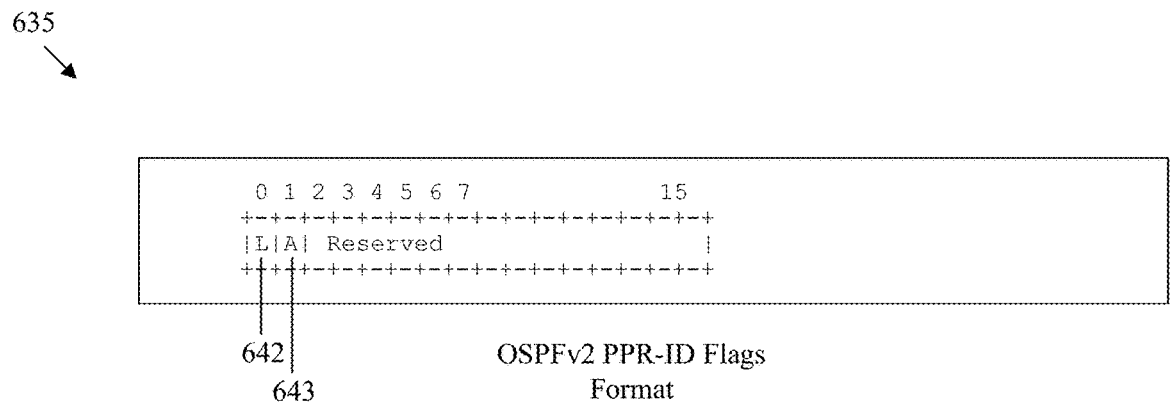
Figure 6E:
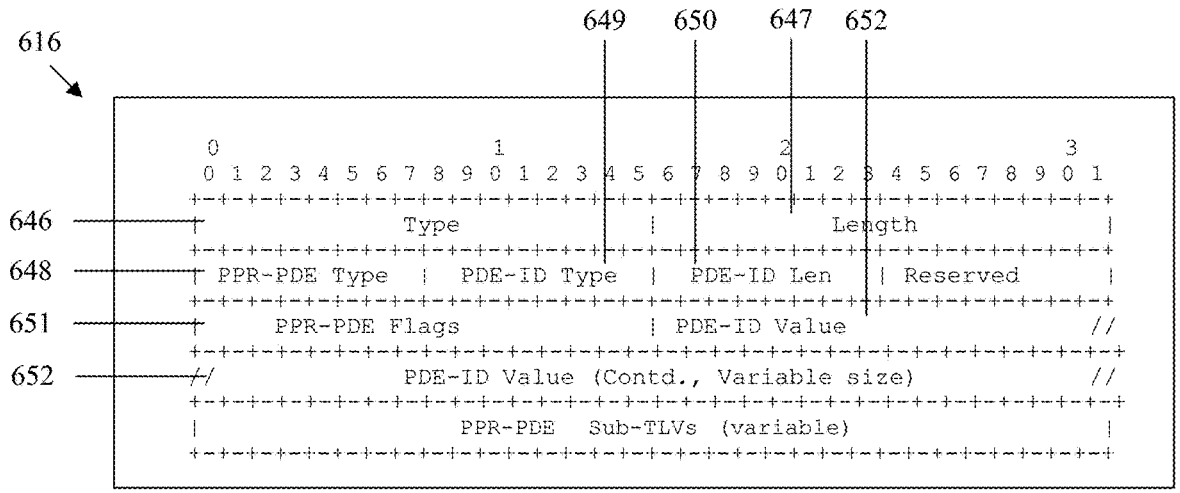
Figure 6F:
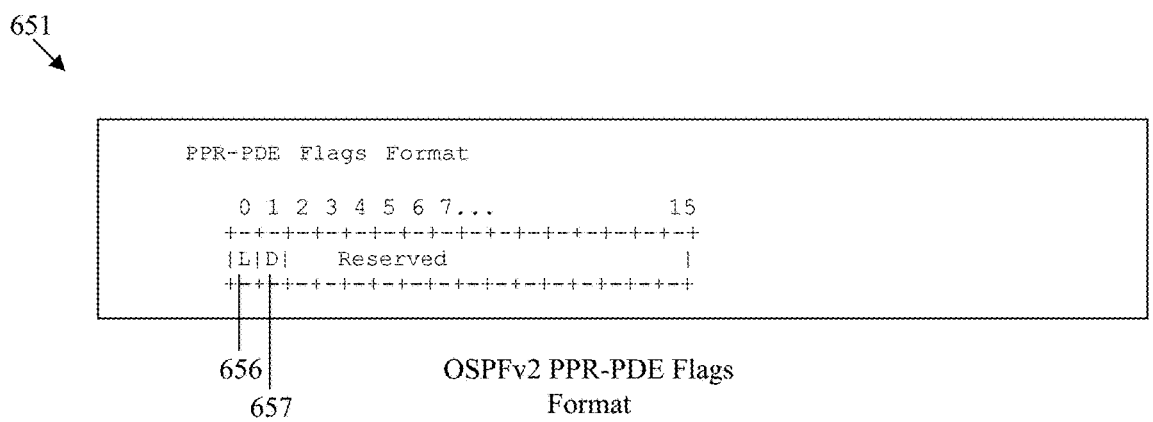

FIG. 6A is a diagram illustrating the PPR flags field 609 included in the PPR flags field 409 of an update 140 encoded according to OSPFv2 according to various embodiments. The PPR flags field 609 may include two different flags 622 and 623. The IA flag 622, labelled as "IA" in FIG. 6A, indicates that, if set, the update 140 is of an inter-area type. In an embodiment, the ingress NE 201-218 may be an area border router. In such an embodiment, the ingress NE 201-218 forwarding the update 140 including the OSPF PPR TLV may set this IA flag 622.

The A flag 623, labelled as "A" in FIG. 6A, indicates that the prefixes and PPR-IDs 333 advertised are directly connected to the originators of the update 140. If the A flag 623 is not set, any other NE in the network may send the update 140 on behalf of the originating node of the update 140. As shown by FIG. 6A, the PPR flags field 609 includes reserved bits that are reserved for future use, should be set to 0, and ignored upon reception.

FIG. 6B is a diagram illustrating the PPR-Prefix sub-TLV 611 included in the PPR sub-TLV 415 of the update 140 and encoded according to OSPFv2 according to various embodiments. The PPR-Prefix sub-TLV 611 is similar to the PPR-Prefix sub-TLV 511 (see FIG. 5B). The PPR-Prefix sub-TLV 611 includes a type field 625, a length field 626, an MT-ID field 627, a prefix length field 628, and a mask length field 629, which may be similar to the type field 525 (see FIG. 5B), length field 526 (see FIG. 5B), MT-ID field 527 (see FIG. 5B), prefix length field 528 (see FIG. 5B), and mask length field 529 (see FIG. 5B) of PPR-Prefix sub-TLV 511 (see FIG. 5B), respectively. As shown in FIG. 6B the lengths of the fields of the PPR-Prefix sub-TLV 611 may differ from the lengths of the fields of the PPR-Prefix sub-TLV 511.

The PPR-Prefix sub-TLV 611 differs from the PPR-Prefix sub-TLV 511 in that the PPR-Prefix sub-TLV 611 includes an OSPFv2 prefix field 630 instead of an IS-IS prefix field 530 (see FIG. 5B). The OSPFv2 prefix field 630 includes the OSPFv2 prefix or destination address, which may refer to the tail-end egress NE 201-218 of the PPR 220A-C or the destination 280 of the PPR 220A-C. The value of the OSPFv2 prefix field 630 may be encoded as a 32 bit value when the AF represents an IPv4 unicast AF.

FIG. 6C is a diagram illustrating the PPR-ID sub-TLV 613 included in an update 140 and encoded according to OSPFv2 according to various embodiments. The PPR-ID sub-TLV 613 is similar to the PPR-ID sub-TLV 513 (see FIG. 5C), except that the PPR-ID sub-TLV 613 is encoded according to OSPFv2. The PPR-ID sub-TLV 613 includes a type field 633, a length field 634, a PPR-ID flags field 635, a PPR-ID type field 636, a PPR-ID length field 637, a PPR-ID mask length field 638 (shown in FIG. 6D as "PPR-ID Mask Len"), an algorithm field 639 (shown in FIG. 6D as "Algo"), and a PPR-ID field 640, which may be similar to the type field 533 (see FIG. 5C), length field 534 (see FIG. 5C), PPR-ID flags field 535 (see FIG. 5C), PPR-ID type field 536 (see FIG. 5C), PPR-ID length field 537 (see FIG. 5C), PPR-ID mask length field 538 (see FIG. 5C), algorithm field 539 (see FIG. 5C), and PPR-ID field 540 (see FIG. 5C) of PPR-ID sub-TLV 513 (see FIG. 5C), respectively. As shown in FIG. 6C, the lengths of the fields of the PPR-ID sub-TLV 613 may differ from the lengths of the fields of the PPR-ID sub-TLV 513.

FIG. 6D is a diagram illustrating the PPR-ID flags field 635 of the PPR-ID sub-TLV 613 included in an update 140 and encoded according to OSPFv2 according to various embodiments. The PPR-ID flags field 635 is similar to the PPR-ID flags field 535, except that the PPR-ID flags field 635 is encoded according to OSPFv2. The PPR-ID flags field 635 includes the L flag 642, which may be similar to the L flag 542 (see FIG. 5D), and the A flag 643, which may be similar to the A flag 543 (see FIG. 5D). As shown by FIG. 6D, the PPR-ID flags field 635 includes reserved bits that are reserved for future use, should be set to 0, and ignored upon reception.

FIG. 6E is a diagram illustrating the PPR-PDE sub-TLV 616 included in the PPR sub-TLV 415 of the update 140 encoded according to OSPFv2 according to various embodiments. The PPR-PDE sub-TLV 616 is similar to the PPR-PDE sub-TLV 516 (see FIG. 5E), except that the PPR-PDE sub-TLV 616 is encoded according to OSPFv2. In an embodiment, each of the PPR-PDEs 427 may include the PPR-PDE sub-TLV 616 for each element 201-218 and 222 (NE 201-218 and intra-domain link 222) on the PPR 220A-C being described. The PPR-PDE sub-TLV 616 includes a type field 646, a length field 647, a PPR-PDE type field 648, a PDE-ID type field 649, a PDE-ID length field 650, a PPR-PDE flags field 651, and a PDE-ID value field 652, which may be similar to the type field 546 (see FIG. 5E), length field 547 (see FIG. 5), PPR-PDE type field 548 (see FIG. 5E), PDE-ID type field 549 (see FIG. 5E), PDE-ID length field 650 (see FIG. 5E), PPR-PDE flags field 551 (see FIG. 5E), and PDE-ID value field 552 (see FIG. 5E) of PPR-PDE sub-TLV 516 (see FIG. 5E), respectively. As shown in FIG. 6E, the lengths of the fields of the PPR-PDE sub-TLV 616 may differ from the lengths of the fields of the PPR-PDE sub-TLV 516.

FIG. 6F is a diagram illustrating the PPR-PDE flags field 651 included in the PPR-PDE sub-TLV 616, which is included in an update 140 and encoded according to OSPFv2 according to various embodiments. The PPR-PDE flags field 651 is be similar to the PPR-PDE flags field 551 (see FIG. 5F), except that the PPR-PDE flags field 651 is encoded according to OSPFv2. The PPR-PDE flags field 651 may include the L flag 656, which may be similar to the L flag 556 (see FIG. 5F), and the D flag 657, which may be similar to the D flag 557 (see FIG. 5F). As shown by FIG. 6F, the PPR-PDE flags field 651 includes reserved bits that are reserved for future use, should be set to 0, and ignored upon reception.

FIGS. 7A-F are diagrams illustrating examples of the update 140, PPR sub-TLVs 415, and fields within the PPR sub-TLVs 415 encoded according to OSPFv3. While some aspects of the update 140 encoded according to OSPFv3 are described below with reference to FIGS. 7A-F, the update 140 encoded according to OSPFv3 is further defined in the PPR OSPF Document referenced above.

Figure 7A:
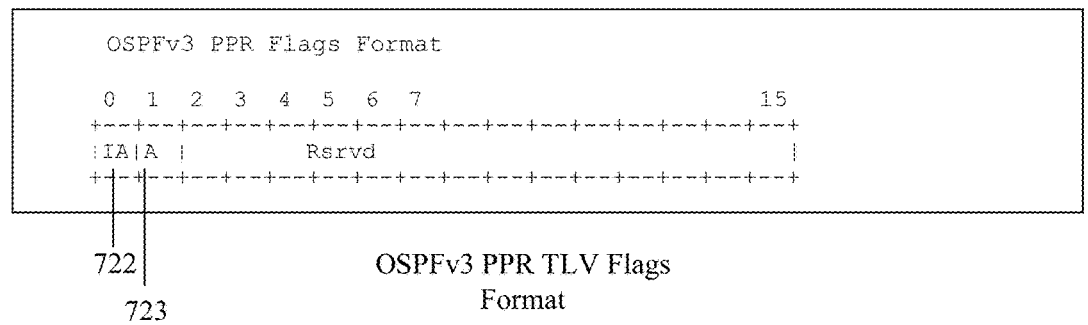
Figure 7B:
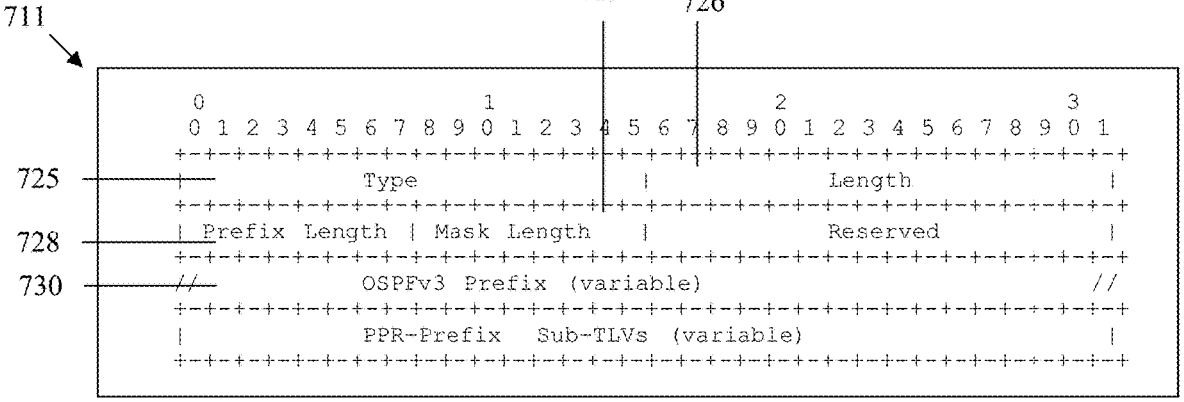
Figure 7C:
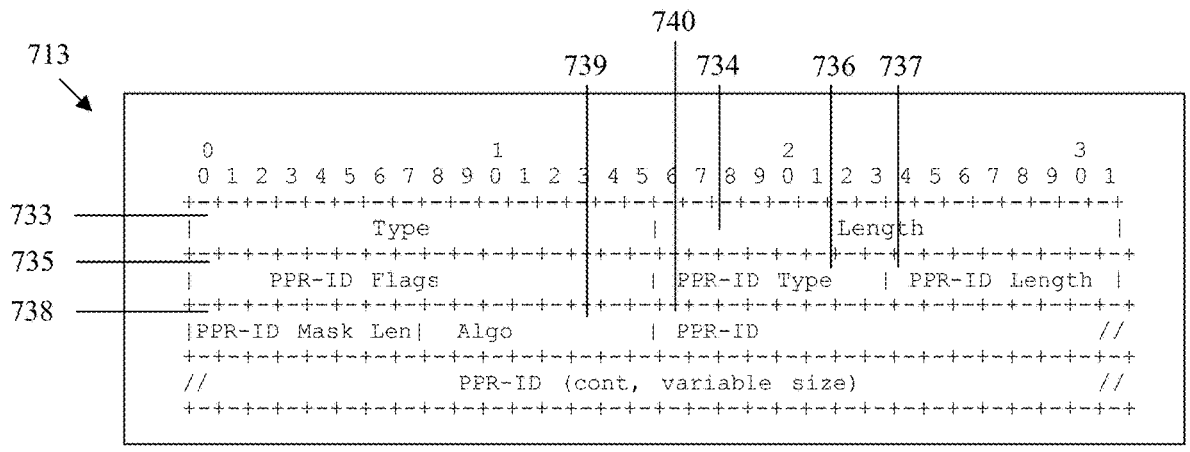
Figure 7D:
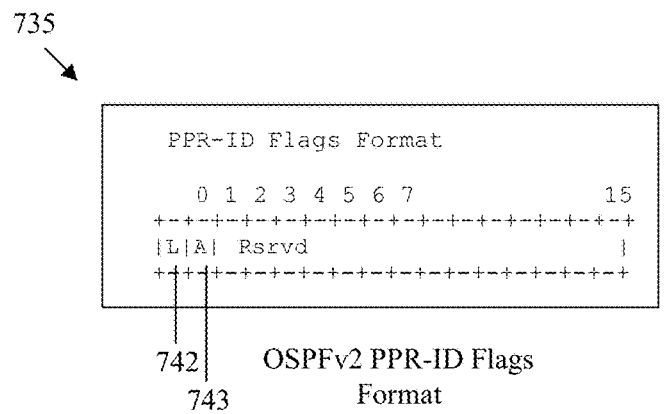
Figure 7E:
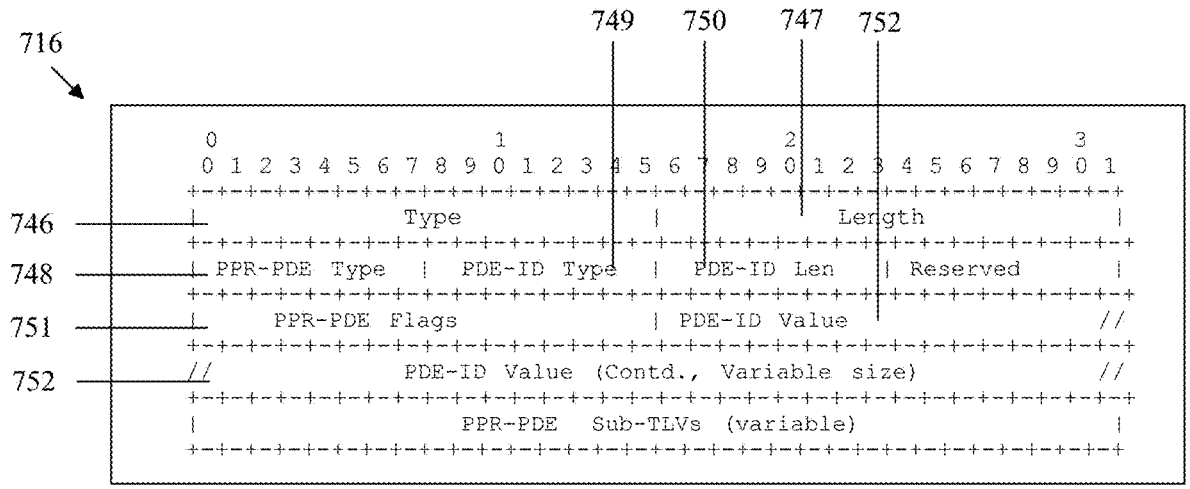
Figure 7F:
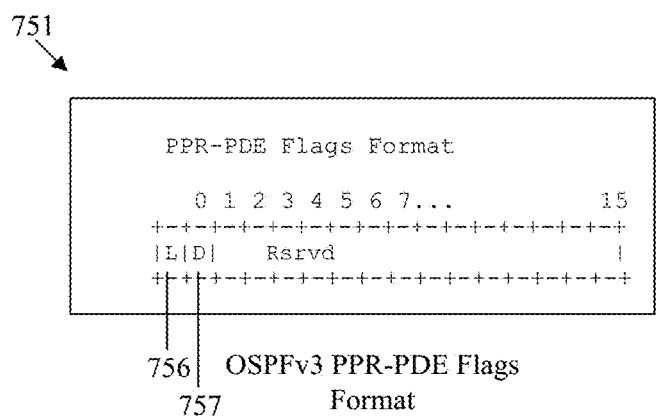

FIG. 7A is a diagram illustrating the PPR flags field 709 included in the PPR flags field 409 of an update 140 and encoded according to OSPFv3 according to various embodiments. The PPR flags field 709 is similar to the PPR flags field 609, except that the PPR flags field 709 is encoded according to OSPFv3. The PPR flags field 709 includes the IA flag 722, which is similar to the IA flag 622 (see FIG. 6A) of PPR flags field 609, and an A flag 723, which is similar to the A flag 623 (see FIG. 6A) of PPR flags field 609. As shown by FIG. 7A, the PPR flags field 709 includes reserved bits that are reserved for future use, should be set to 0, and ignored upon reception.

FIG. 7B is a diagram illustrating the PPR-Prefix sub-TLV 711 included in the PPR sub-TLV 415 of the update 140 encoded according to OSPFv3 according to various embodiments. The PPR-Prefix sub-TLV 711 is similar to the PPR-Prefix sub-TLV 611, except that the PPR-Prefix sub-TLV 711 is encoded according to OSPFv3. The PPR-Prefix sub-TLV 711 includes a type field 725, a length field 726, a prefix length field 728, and a mask length field 729, which may be similar to the type field 625 (see FIG. 6B), length field 626 (see FIG. 6B), prefix length field 628 (see FIG. 6B), and mask length field 629 (see FIG. 6B) of PPR-Prefix sub-TLV 611, respectively. However, the PPR-Prefix sub-TLV 711 does not include a field for the multi-topological identifier, as included in PPR-Prefix sub-TLV 611. As shown in FIG. 7B the lengths of the fields of the PPR-Prefix sub-TLV 611 may differ from the lengths of the fields of the PPR-Prefix sub-TLV 611.

The PPR-Prefix sub-TLV 711 differs from the PPR-Prefix sub-TLV 611 in that the PPR-Prefix sub-TLV 711 includes an OSPFv3 prefix field 730 instead of an OSPFv2 prefix field 630 (see FIG. 6B). The OSPFv3 prefix field 730 includes the OSPFv3 prefix or destination address 445, which may refer to the tail-end egress NE 201-218 of the PPR 220A-C. The value of the OSPFv3 prefix field 730 may be encoded as a 32 bit value when the AF represents an IPv4 unicast AF.

FIG. 7C is a diagram illustrating the PPR-ID sub-TLV 713 included in an update 140 encoded according to OSPFv3 according to various embodiments. The PPR-ID sub-TLV 713 is similar to the PPR-ID sub-TLV 613, except that the PPR-ID sub-TLV 713 is encoded according to OSPFv3. The PPR-ID sub-TLV 713 includes a type field 733, a length field 734, a PPR-ID flags field 735, a PPR-ID type field 736, a PPR-ID length field 737, a PPR-ID mask length field 738 (shown in FIG. 7D as "PPR-ID Mask Len"), an algorithm field 739 (shown in FIG. 7D as "Algo"), and a PPR-ID field 740, which may be similar to the type field 633 (see FIG. 6C), length field 634 (see FIG. 6C), PPR-ID flags field 635 (see FIG. 6C), PPR-ID type field 636 (see FIG. 6C), PPR-ID length field 637 (see FIG. 6C), PPR-ID mask length field 638 (see FIG. 6C), algorithm field 639 (see FIG. 6C), and PPR-ID field 640 (see FIG. 6C) of PPR-ID sub-TLV 613, respectively. As shown in FIG. 7C, the lengths of the fields of the PPR-ID sub-TLV 713 may differ from the lengths of the fields of the PPR-ID sub-TLV 613.

FIG. 7D is a diagram illustrating the PPR-ID flags field 735 PPR-ID sub-TLV 713 included in an update 140 encoded according to OSPFv3 according to various embodiments. The PPR-ID flags field 735 is similar to the PPR-ID flags field 535 (see FIG. 5D), except that the PPR-ID flags field 735 is encoded according to OSPFv3. The PPR-ID flags field 735 includes the L flag 742, which may be similar to the L flag 642 (see FIG. 5D), and the A flag 743, which may be similar to the A flag 543 (see FIG. 5). As shown by FIG. 7D, the PPR-ID flags field 735 includes reserved bits that are reserved for future use, should be set to 0, and ignored upon reception.

FIG. 7E is a diagram illustrating the PPR-PDE sub-TLV 716 included in the PPR sub-TLV 415 of the update 140 encoded according to OSPFv3 according to various embodiments. The PPR-PDE sub-TLV 716 is similar to the PPR-PDE sub-TLV 616, except the PPR-PDE sub-TLV 716 is encoded according to OSPFv3. In an embodiment, each of the PPR-PDES 427 (see FIG. 4B) may include the PPR-PDE sub-TLV 716 for each element 201-218 and 222 (NE 201-218 and intra-domain link 222) on the PPR 220A-C being described. The PPR-PDE sub-TLV 716 includes a type field 746, a length field 747, a PPR-PDE type field 748, a PDE-ID type field 749, a PDE-ID length field 750, a PPR-PDE flags field 751, and a PDE-ID value field 752, which may be similar to the type field 646 (see FIG. 6E), length field 647 (see FIG. 6E), PPR-PDE type field 648 (see FIG. 6E), PDE-ID type field 649 (see FIG. 6E), PDE-ID length field 650 (see FIG. 6E), PPR-PDE flags field 651 (see FIG. 6E), and PDE-ID value field 652 (see FIG. 6E) of PPR-PDE sub-TLV 616, respectively. As shown in FIG. 7E, the lengths of the fields of the PPR-PDE sub-TLV 716 may differ from the lengths of the fields of the PPR-PDE sub-TLV 616.

FIG. 7F is a diagram illustrating the PPR-PDE flags field 751 included in the PPR-PDE sub-TLV 716, which is included in an update 140 encoded according to OSPFv3 according to various embodiments. The PPR-PDE flags field 751 is similar to the PPR-PDE flags field 551 (see FIG. 5F), except that PPR-PDE flags field 751 is encoded according OSPFv3. The PPR-PDE flags field 751 may include the L flag 756, which may be similar to the L flag 556 (see FIG. 5F), and the D flag 757, which may be similar to the D flag 557 (see FIG. 5F). As shown by FIG. 7F, the PPR-PDE flags field 751 includes reserved bits that are reserved for future use, should be set to 0, and ignored upon reception.

Figure 8:
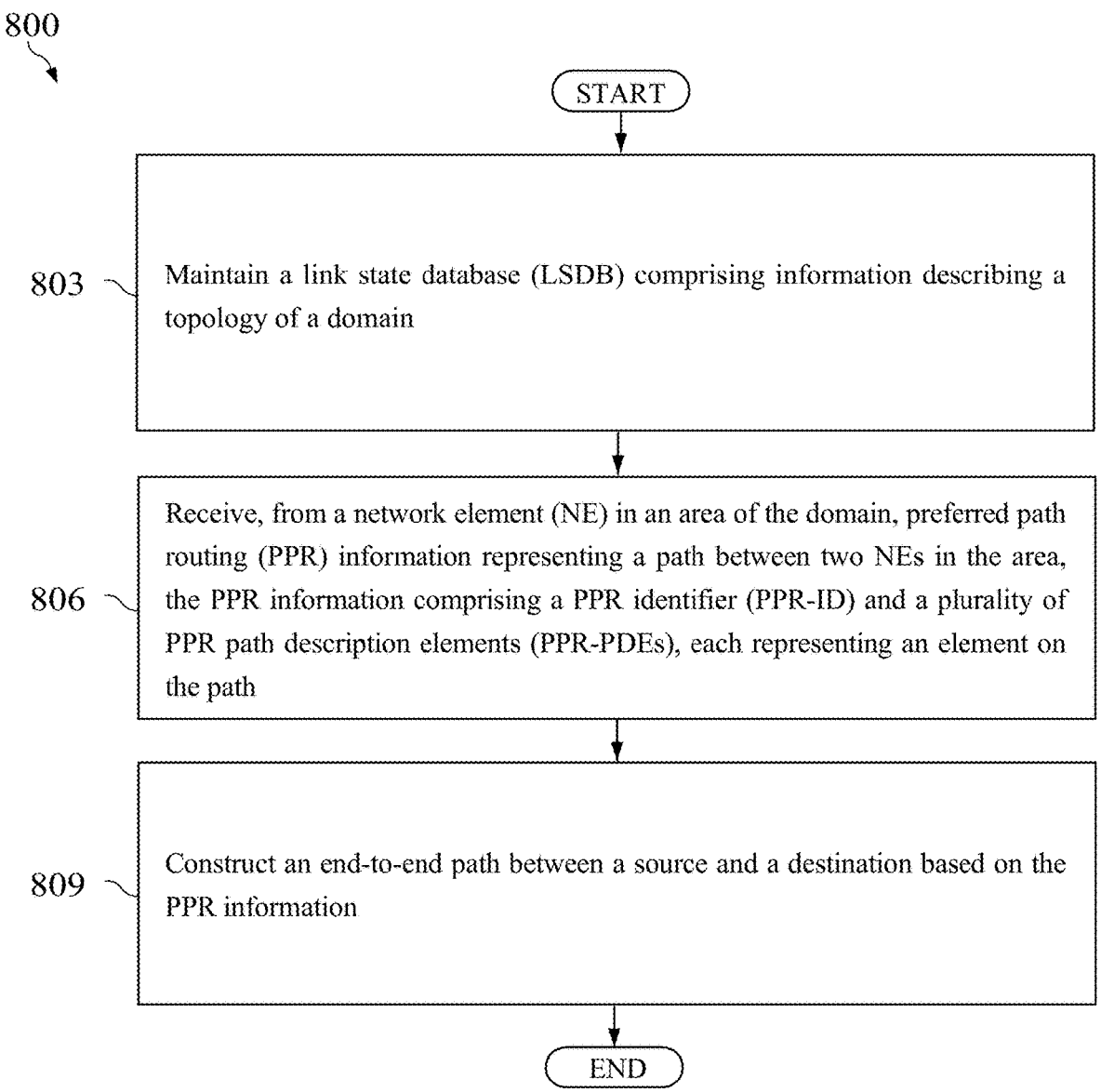
FIG. 8 is a method for implementing PPR information distribution and maintenance in a multi-domain network according to various embodiments of the disclosure.

FIG. 8 is a method 800 for implementing the maintenance and distribution of PPR information 130 in a multi-domain network 200 according to various embodiments of the disclosure. In particular, method 800 relates to northbound communication from one of the NEs 201-218 to the central entity 103. In an embodiment, method 800 may be performed by a central entity 103.

At step 803, an LSDB 351 comprising information describing a topology of a domain 100A-B is maintained or stored at a central entity 103. For example, the LSDB 351 is stored in a memory 360 of the central entity 103 (implemented similar to NE 300).

At step 806, PPR information 130 describing a PPR 220A-C between two NEs 201-218 is received from an NE 201-218 in the area 250A-C of the domain 100A-B. For example, Rx 320 receives PPR information 130 describing a PPR 220A-C between two NEs 201-218 from an NE 201-218 in the multi-domain network 200. In an embodiment, the PPR information 130 comprising a PPR-ID 333 and one or more PPR-PDEs 366 describing one or more elements 201-218 and 222 (NEs 201-218 and intra-domain link 222) on the PPR 120A-C. In an embodiment, the LSDB 351 is updated based on the PPR information 130 received from the NE 201-218. In an embodiment, at least a portion of the PPR information 130 is shared with other central entities 103 in the multi-domain network 200.

In an embodiment, the PPR information 130 is received as an update 140 encoded as a BGP-LS NLRI or BGP-LS attribute, pursuant to IETF RFC 7752. In an embodiment, the LSDB 351 stores information associated with the PPRs 220A-C and the predetermined shortest paths 225A-C. In an embodiment, the PPR-ID 333 is at least one of an MPLS label, a SID, an IPv4 address, or an IPv6 address.

At step 809, an end-to-end path 260 is constructed between a source 270 and a destination 280 in the multi-domain network 200 based on the PPR information 130. For example, the network configuration module 335 executed by the processor 330 of a central entity 103 (implemented as a NE 300) is configured to construct an end-to-end path 260 between a source 270 and a destination 280 in the multi-domain network 200 based on the PPR information 130.

Figure 9:
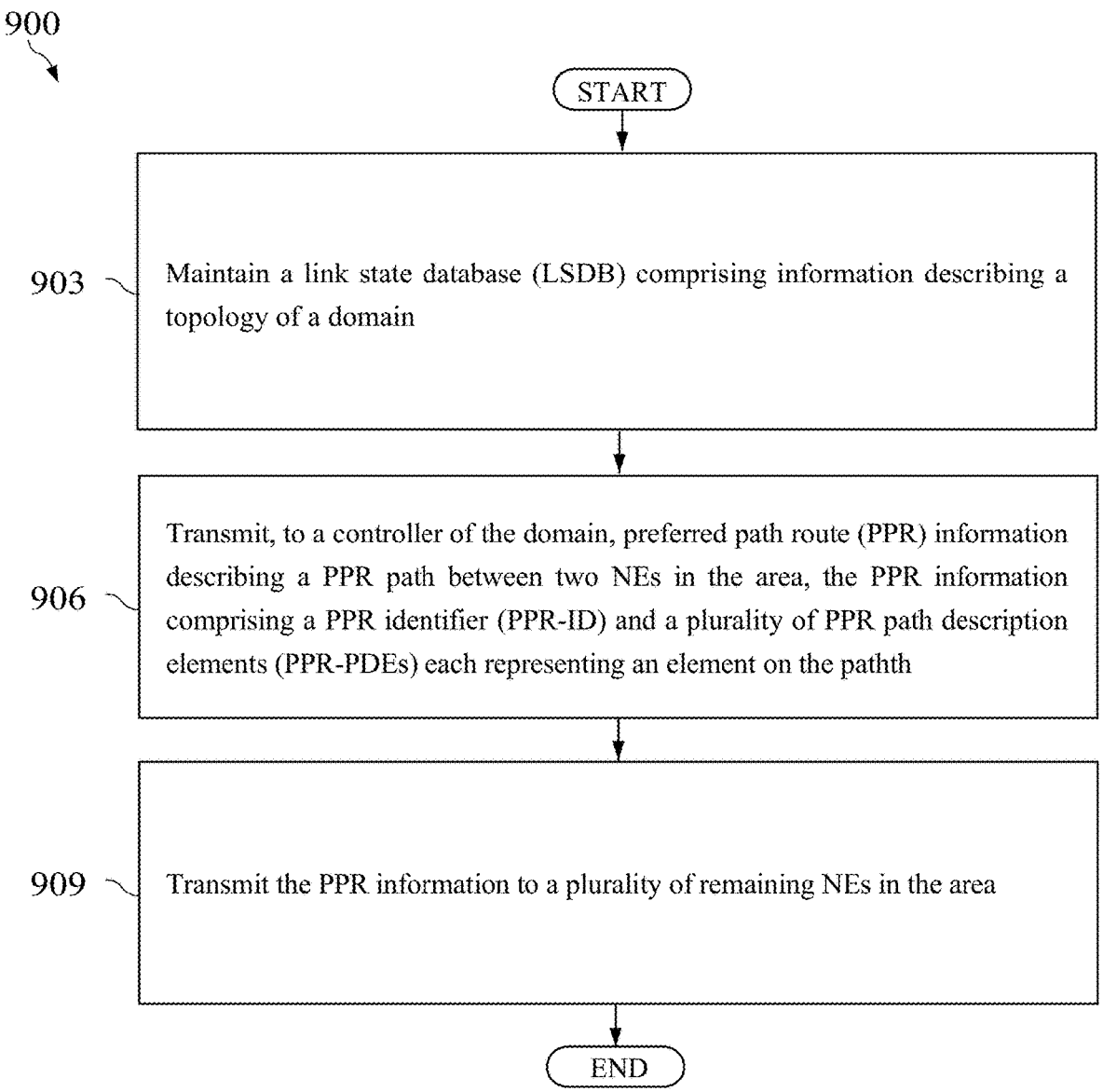
FIG. 9 is another method for implementing PPR information distribution and maintenance in a multi-domain network according to various embodiments of the disclosure.

FIG. 9 is a method 900 for implementing the maintenance and distribution of PPR information 130 in a multi-domain network 200 according to various embodiments of the disclosure. In an embodiment, method 900 may be performed by an NE 201-218 in an area 250A-C that is configured to transmit PPR information 130 to the central entity 103. In an embodiment, method 900 may be performed by NE 203 in area 250A, NE 210 in area 250B, and NE 216 in area 250C.

At step 903, an LSDB 351 comprising information describing a topology of a domain 100A-B is maintained or stored at an NE 201-218. For example, the LSDB 351 is stored in a memory 360 of an NE 201-218 (implemented similar to NE 300).

At step 906, PPR information 130 describing a PPR 220A-C between two NEs 201-218 is transmitted from an NE 201-218 in the area 250A-C of the domain 100A-B to a central entity 103 of the domain 100A-B. For example, Tx 340 transmits PPR information 130 describing a PPR 220A-C between two NEs 201-218 from an NE 201-218 in the multi-domain network 200 to a central entity 103. In an embodiment, the PPR information 130 comprises a PPR-ID 333 and one or more PPR-PDEs 366 describing one or more elements 201-218 and 222 (NEs 201-218 and intra-domain link 222) on the PPR 120A-C.

At step 909, the PPR information 130, or new PPR information 130, is transmitted to a plurality of remaining NEs 201-218 in an area 250A-C in response to the PPR information 130 being received from the central entity 103. For example, Tx 340 transmits the PPR information 130 to a plurality of remaining NEs 201-218 in an area 250A-C.

FIG. 10 is a method 1000 for implementing the maintenance and distribution of PPR information 130 in a multi-domain network 200 according to various embodiments of the disclosure. In particular, method 1000 relates to southbound communication from the central entity 103 to one or more of the NEs 201-218. In an embodiment, method 1000 may be performed by a central entity 103.

At step 1003, an LSDB 351 comprising information describing a topology of a domain 100A-B is maintained or stored at a central entity 103. For example, the LSDB 351 is stored in a memory 360 of the central entity 103 (implemented similar to NE 300).

At step 1006, PPR information 130 describing a PPR 220A-C between two NEs 201-218 is transmitted to an NE 201-218 in the area 250A-C of the domain 100A-B. For example, Tx 340 transmits the PPR information 130 describing a PPR 220A-C between two NEs 201-218 from the central entity 103 to an NE 201-218 in the multi-domain network 200. In an embodiment, the PPR information 130 comprising a PPR-ID 333 and one or more PPR-PDEs 366 describing one or more elements 201-218 and 222 (NEs 201-218 and intra-domain link 222) on the PPR 120A-C. In an embodiment, the LSDB 351 is updated based on the PPR information 130 received from the NE 201-218. In an embodiment, at least a portion of the PPR information 130 is shared with other central entities 103 in the multi-domain network 200.

In an embodiment, the PPR information 130 is transmitted from the central entity 103 to one or more of NEs 201-218 in a message 144 is encoded according to BGP-LS, pursuant to IETF RFC 7752. In an embodiment, the LSDB 351 stores information associated with the PPRs 220A-C and the predetermined shortest paths 225A-C. In an embodiment, the PPR-ID 333 is at least one of an MPLS label, a SID, an IPv4 address, or an IPv6 address.

Figure 11:
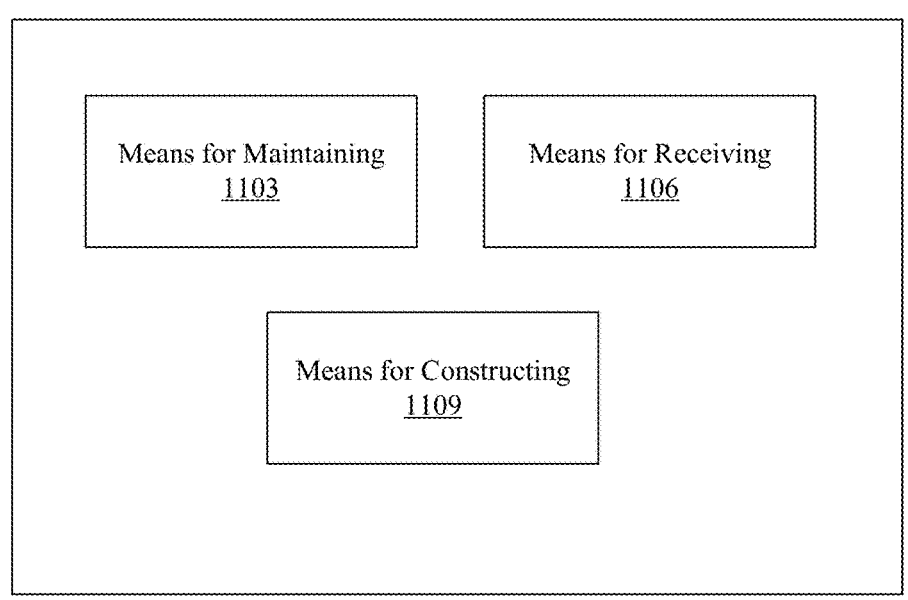
FIG. 11 shows an apparatus for implementing PPR information distribution and maintenance in a multi-domain network according to various embodiments of the disclosure

FIG. 11 shows an apparatus 1100 for implementing the maintenance and distribution of PPR information 130 in a multi-domain network 200 according to various embodiments of the disclosure. The apparatus 1100 comprises a means for maintaining 1103, a means for receiving 1106, and a means for constructing 1109. The means for maintaining 1103 comprises a means for maintaining or storing an LSDB 351 comprising information describing a topology of a domain 100A-B. The means for receiving 1106 comprises a means for receiving PPR information 130 describing a PPR 220A-C between two NEs 201-218 from an NE 201-218 in the area 250A-C of the domain 100A-B. The means for constructing 1109 comprises a means for constructing an end-to-end path 260 between a source 270 and a destination 280 in the multi-domain network 200 based on the PPR information 130.

Figure 12:
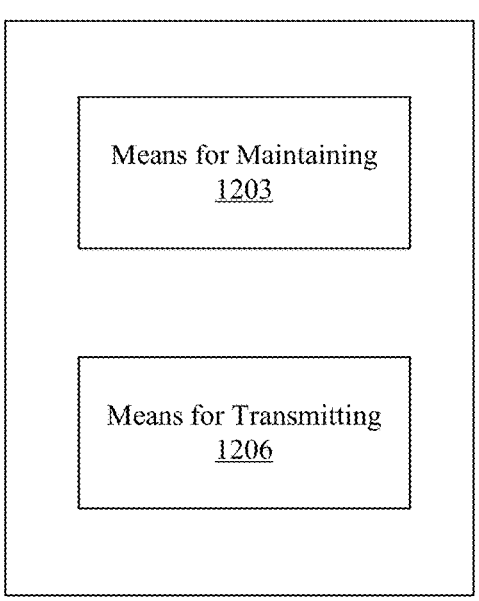
FIG. 12 shows an apparatus for implementing the maintenance and distribution of PPR information in a multi-domain network according to various embodiments of the disclosure.

FIG. 12 shows an apparatus 1200 for implementing the maintenance and distribution of PPR information 130 in a multi-domain network 200 according to various embodiments of the disclosure. The apparatus 1200 comprises a means for maintaining 1203 and a means for transmitting 1206. The means for maintaining 1203 comprises a means for maintaining or storing an LSDB 351 comprising information describing a topology of a domain 100A-B. The means for transmitting 1206 comprises a means for transmitting PPR information 130 describing a PPR 220A-C between two NEs 201-218 to a central entity 103 of the domain 100A-B. The means for transmitting 1206 further comprises a means for transmitting PPR information 130 to a plurality of remaining NEs 201-218 in an area 250A-C.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented performed by a network element (NE) in a domain in a multi-domain network, comprising:
maintaining a link state database (LSDB) comprising information describing a topology of the domain;
transmitting, to a central entity in an area of the domain, a capabilities advertisement indicating the NE is capable of processing a Border Gateway Protocol (BGP) Network Layer Reachability Information (NLRI);
receiving, from the central entity, an update comprising preferred path route (PPR) information describing a PPR from a source to a destination in the area after transmitting the capabilities advertisement, the PPR information comprising a PPR identifier (PPR-ID) and a plurality of PPR description elements (PPR-PDEs) each representing an element on the PPR, the update being encoded as the BGP NLRI; and
updating the LSDB based on the PPR information describing the PPR.

2. The method of claim 1, further comprising:
receiving, from a second NE in a second area of the multi-domain network, second PPR information describing a second PPR provisioned in the second area; and
updating the LSDB based on the second PPR information describing the second PPR.

3. The method of claim 1, wherein the NLRI is a BGP Link State (BGP-LS) NLRI.

4. The method of claim 1, wherein the LSDB stores information associated with the PPR and a predetermined shortest path between the source and the destination, wherein the PPR deviates from the predetermined shortest path between the source and the destination based on a network characteristic requested by a source, and wherein the network characteristic comprises at least one of bandwidth, jitter, latency, throughput, or error rate.

5. The method of claim 1, wherein the PPR-ID is at least one of a Multi-Protocol Label Switching (MPLS) label, a segment identifier (SID), an Internet Protocol (IP) version 4 (IPv4) address, or an IP version 6 (IPv6) address.

6. The method of claim 1, wherein each of the plurality of PPR-PDEs represents a topological element or a non-topological NE on the PPR, wherein the topological element comprises at least one of a network element or a link, and wherein the non-topological element comprises at least one of a service, function, or context.

7. The method of claim 1, further comprising transmitting the PPR information to a plurality of remaining NEs in the area.

8. A network element (NE) implemented in an area of a domain within a multi-domain network, comprising:
a memory configured to store a link state database (LSDB) describing a topology of the domain;
a transmitter configured to transmit, to a central entity of the domain, a capabilities advertisement indicating the NE is capable of processing a Border Gateway Protocol (BGP) Network Layer Reachability Information (NLRI);
a receiver configured to receive an update comprising preferred path route (PPR) information describing a PPR between two NEs in the area from a central entity of the domain after the capabilities advertisement is transmitted, the PPR information comprising a PPR identifier (PPR-ID) and a plurality of PPR description elements (PPR-PDEs) each representing an element on the PPR, the update being encoded as the BGP NLRI; and
a processor coupled to the transmitter, the receiver, and the memory, the processor configured to update the LSDB based on the PPR information describing the PPR,
wherein the transmitter is further configured to transmit the PPR information to a plurality of remaining NEs in the area.

9. The NE of claim 8, wherein the NLRI is a BGP Link State (BGP-LS) NLRI.

10. The NE of claim 8, wherein each of the plurality of PPR-PDEs comprises an address of a respective element on the PPR and a path description element (PDE) identifier (PDE-ID) that defines a type of the address.

11. The NE of claim 8, wherein the NE is configured as at least one of a Border Gateway Protocol (BGP) Route Reflector (RR), a BGP-Link State (LS) speaker, or an Automated System Border Router (ASBR).

12. A method performed by a central entity implemented in a domain of a multi-domain network, comprising:
maintaining a link state database (LSDB) comprising information describing a topology of the domain;
receiving, from a network element (NE) in an area of the domain, a capabilities advertisement indicating the NE is capable of processing a Border Gateway Protocol (BGP) Network Layer Reachability Information (NLRI); and
transmitting, to a network element (NE) in an area of the domain, an update comprising preferred path route (PPR) information describing a PPR from a source to a destination in the area after receiving the capabilities advertisement, the PPR information comprising a PPR identifier (PPR-ID) and a plurality of PPR description elements (PPR-PDEs) each representing an element on the PPR, the update being encoded as the BGP NLRI.

13. The method of claim 12, further comprising:
receiving, from a second central entity in a second domain of the multi-domain network, second PPR information describing a second PPR provisioned in the second domain of the multi-domain network;
updating the LSDB based on the second PPR information describing the second PPR.

14. The method of claim 12, further comprising:
constructing an end-to-end path between the source and the destination; and
generating the PPR information based on the end-to-end path.

15. The method of claim 12, wherein the PPR-ID is at least one of a Multi-Protocol Label Switching (MPLS) label, a segment identifier (SID), an Internet Protocol (IP) version 4 (IPv4) address, or an IP version 6 (IPv6) address.

16. The method of claim 12, wherein each of the PPR-PDEs comprises an address of a respective element on the PPR.

17. The method of claim 12, wherein the LSDB stores information associated with the PPR and a predetermined shortest path between the source and the destination, wherein the PPR deviates from the predetermined shortest path between the source and the destination based on a network characteristic requested by a client, and wherein the network characteristic comprises at least one of bandwidth, jitter, latency, throughput, or error rate.

18. The method of claim 1, wherein the update is encoded as a BGP prefix NLRI.

19. The NE of claim 8, wherein the update is encoded as a BGP prefix NLRI.

20. The method of claim 12, wherein the update is encoded as a BGP prefix NLRI.

\* \* \* \* \*

UNITED STATES PATENT AND TRADEMARK OFFICE
CERTIFICATE OF CORRECTION

| | |
|---|---|
| PATENT NO. | : 11,431,630 B2 |
| APPLICATION NO. | : 17/033191 |
| DATED | : August 30, 2022 |
| INVENTOR(S) | : Uma S. Chunduri |

It is certified that error appears in the above-identified patent and that said Letters Patent is hereby corrected as shown below:

In the Claims

Column 31, Lines 1-22, Claim 1, should read:
1. A method performed by a network element (NE) in a domain in a multi-domain network, comprising:
    maintaining a link state database (LSDB) comprising information describing a topology of the domain;
    transmitting, to a central entity in an area of the domain, a capabilities advertisement indicating the NE is capable of processing a Border Gateway Protocol (BGP) Network Layer Reachability Information (NLRI);
    receiving, from the central entity, an update comprising preferred path route (PPR) information describing a PPR from a source to a destination in the area after transmitting the capabilities advertisement, the PPR information comprising a PPR identifier (PPR-ID) and a plurality of PPR description elements (PPR-PDEs) each representing an element on the PPR, the update being encoded as the BGP NLRI; and
    updating the LSDB based on the PPR information describing the PPR.

Signed and Sealed this
Fifteenth Day of November, 2022

Katherine Kelly Vidal
*Director of the United States Patent and Trademark Office*